US010341981B2

(12) United States Patent
Yu et al.

(10) Patent No.: US 10,341,981 B2
(45) Date of Patent: Jul. 2, 2019

(54) USER TERMINAL DEVICE AND METHOD FOR RECOGNIZING USER'S LOCATION USING SENSOR-BASED BEHAVIOR RECOGNITION

(71) Applicants: Samsung Electronics Co., Ltd., Suwon-si, Yeongtong-gu (KR); INDUSTRY-ACADEMIC COOPERATION FOUNDATION, YONSEI UNIVERSITY, Seoul (KR)

(72) Inventors: Seung-hak Yu, Yongin-si (KR); Seung-woo Lee, Seoul (KR); Ho-jung Cha, Seoul (KR); Yo-han Ko, Seoul (KR); Soo-hwan Kim, Seoul (KR); Hyun-choong Kim, Seoul (KR); Jong-hoon Shin, Seoul (KR); Kyoung-woo Lee, Seoul (KR); Seong-il Hahm, Yongin-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 15/754,512

(22) PCT Filed: Jul. 12, 2016

(86) PCT No.: PCT/KR2016/007544
§ 371 (c)(1),
(2) Date: Feb. 22, 2018

(87) PCT Pub. No.: WO2017/039140
PCT Pub. Date: Mar. 9, 2017

(65) Prior Publication Data
US 2018/0249435 A1 Aug. 30, 2018

(30) Foreign Application Priority Data
Sep. 2, 2015 (KR) .................. 10-2015-0124498

(51) Int. Cl.
*H04W 64/00* (2009.01)
*H04L 29/08* (2006.01)
(Continued)

(52) U.S. Cl.
CPC ............. *H04W 64/00* (2013.01); *H04L 29/08* (2013.01); *H04W 4/023* (2013.01); *H04W 4/80* (2018.02);
(Continued)

(58) Field of Classification Search
CPC ....... H04W 4/023; H04W 4/80; H04W 64/00; H04L 29/08; H04M 2250/02; H04M 2250/12
See application file for complete search history.

(56) References Cited

U.S. PATENT DOCUMENTS

| | | | |
|---|---|---|---|
| 6,323,807 B1 | 11/2001 | Golding et al. | |
| 2008/0008044 A1 | 1/2008 | Patterson et al. | |
| 2017/0041205 A1* | 2/2017 | Rangel | H04L 43/065 |

FOREIGN PATENT DOCUMENTS

| | | |
|---|---|---|
| KR | 10-2012-0013842 A | 2/2012 |
| KR | 10-2012-0043845 A | 5/2012 |

(Continued)

OTHER PUBLICATIONS

Kaushik et al.; Characterization of PIR detector for monitoring occupancy patterns and functional health status of elderly people living alone at home; Technology and Health Care 15 (2007); pp. 273-288; IOS Press; May 14,2017.
(Continued)

*Primary Examiner* — Wayne H Cai
(74) *Attorney, Agent, or Firm* — Jefferson IP Law, LLP

(57) ABSTRACT

Disclosed is a system for recognizing a user location using sensor-based activity recognition. The system includes a mobile device which includes a sensor module configured to
(Continued)

sense information about at least one of a user state and surrounding environments, a first processor configured to extract activity information based on the sensed information, and a first communication module configured to transmit the extracted activity information; and a user terminal device which includes a second communication module configured to receive the activity information from the first communication module, and a processor configured to determine a user location in a user space corresponding to a user activity based on the received activity information. By determining a user's location in a user space corresponding to a user activity, it is possible to control electronic devices corresponding to the user activity or provide a service of monitoring activities of the old and weak and the child.

13 Claims, 26 Drawing Sheets

(51) Int. Cl.
*H04W 4/02* (2018.01)
*H04W 4/80* (2018.01)

(52) U.S. Cl.
CPC .... *H04M 2250/02* (2013.01); *H04M 2250/12* (2013.01)

(56) References Cited

FOREIGN PATENT DOCUMENTS

| KR | 10-2013-0048268 A | 5/2013 |
| KR | 10-2013-0064129 A | 6/2013 |
| KR | 10-2013-0076406 A | 7/2013 |
| KR | 10-2015-0087756 A | 7/2015 |
| WO | 2014/209697 A1 | 12/2014 |

OTHER PUBLICATIONS

Ranjan et al.; An RF Doormat for Tracking People's Room Locations; ACM; Sep. 8-12, 2013, Zurich, Switzerland.

Hnat et al.; Doorjamb: Unobtrusive Room-level Tracking of People in Homes using Doorway Sensors; ACM; Nov. 6-9,2012, Toronto, Canada.

Song et al.; Surveillance Tracking System Using Passive Infrared Motion Sensors in Wireless Sensor Network; Korea Electronics and Technology Institute; South Korea 2008.

Wilson et al.; See-Through Walls: Motion Tracking Using Variance-Based Radio Tomography Networks; IEEE Transactions on Mobile Computing; vol. 10; No. 5,; IEEE CS et al.; May 2011; Salt Lake City, Utah.

Kim et al.; Smartphone-Based Collaborative and Autonomous Radio Fingerprinting; IEEE Transactions on Systems, Man, and Cybernetics—Part C: Applications and Reviews; vol. 42; No. 1; Jan. 2012; Seoul, KR.

Hardegger et al.; ActionSLAM: Using location-related actions as landmarks in pedestrian SLAM; 2012 International Conference on Indoor Positioning and Indoor Navigation; IEEE; Nov. 13-15, 2012.

Woodman et al.; Pedestrian Localisation for Indoor Environments; UbiComp'08; Sep. 21-24, 2008, Seoul, Korea.

Bahl et al.; RADAR: An In-Building RF-based User Location and Tracking System; Microsoft Research 2000.

Steinhoff et al.; Dead Reckoning from the Pocket—An Experimental Study; IEEE; 2009; Germany.

Lee et al.; Non-obstructive Room-level Locating System in Home Environments using Activity Fingerprints from Smartwatch; UBICOMP '15; ACM; Sep. 7-11, 2015; Osaka, Japan.

* cited by examiner

FIG. 3

| ROOMS | ELECTRONIC DEVICES & FURNITURE |
|---|---|
| LIVING ROOM | PC<br>SOFA<br>TV |
| KITCHEN/<br>DINING ROOM | REFRIGERATOR<br>GAS STOVE<br>TABLE<br>COFFEE MAKER |
| BATH ROOM | HAIR DRIER<br>BATHTUB<br>TOILET |
| MAIN ROOM | BED<br>DRESSING ROOM |
| ROOM 1 | BED<br>DESK |
| UTILITY ROOM | WASHING MACHINE<br>HANGER |

FIG. 4

| | LIVING ROOM | KITCHEN | BATHROOM | MAIN ROOM | ROOM 1 | UTILITY ROOM |
|---|---|---|---|---|---|---|
| WATCHING TV | A | | | | | |
| EATING | | A | | | | |
| USING PC | A | | | | | |
| CLEANING | A | A | A | A | A | |
| COOKING | | A | | | | |
| WASHING DISH | | A | | | | |
| DRINKING TEA | A | A | | | | |
| SLEEPING | A | | | A | | |
| TALKING | A | | | | A | |
| SHOWERING | | | A | | | |
| WASHING FACE | | | A | | | |
| RELIEVING HIM/HERSELF | | | A | | | |
| READING | A | | | | | |
| PICKING LAUNDRY | | A | | | | A |
| FOLDING LAUNDRY | A | A | | | | A |
| DRYING HAIR | A | | A | | | |
| MAKING COFFEE | | A | | | | |

(USER A)

FIG. 5

| | LIVING ROOM | KITCHEN | BATHROOM | MAIN ROOM | ROOM 1 | UTILITY ROOM |
|---|---|---|---|---|---|---|
| WATCHING TV | B | | | | | |
| EATING | B | B | | | | |
| USING PC | B | | | | | |
| CLEANING | | | | | | |
| COOKING | | B | | | | |
| WASHING DISH | | B | | | | |
| DRINKING TEA | B | B | | | | |
| SLEEPING | | | | | B | |
| TALKING | B | | | | | |
| SHOWERING | | | B | | | |
| WASHING FACE | | | B | | | |
| RELIEVING HIM/HERSELF | | | B | | | |
| READING | B | | | | | |
| PICKING LAUNDRY | | | | | | B |
| FOLDING LAUNDRY | | | | | | |
| DRYING HAIR | | | | | | |
| MAKING COFFEE | | B | | | | |

(USER B)

HOME A

HOME B

FIG. 20

|  |  | PREDICTION ||||||  RECALL(%) |
|---|---|---|---|---|---|---|---|---|
|  |  | MAIN ROOM | ROOM A | ROOM B | KITCHEN | LIVING ROOM | BATH ROOM |  |
| SPACE IN HOUSE | ROOM 1 | 8964 | 4 | 17 | 140 | 92 | 144 | 95.8 |
|  | ROOM 2 | 5 | 6642 | 3 | 99 | 192 | 161 | 93.5 |
|  | ROOM 3 | 15 | 3 | 2545 | 3 | 1 | 7 | 98.9 |
|  | KITCHEN | 122 | 161 | 0 | 3792 | 260 | 141 | 84.7 |
|  | LIVING ROOM | 219 | 440 | 43 | 209 | 14777 | 20 | 94.1 |
|  | BATH ROOM | 517 | 62 | 2 | 165 | 358 | 3170 | 74.2 |
| PRECISION(%) || 91.1 | 90.8 | 97.5 | 86.0 | 94.2 | 87.0 |  |

USER TERMINAL DEVICE AND METHOD FOR RECOGNIZING USER'S LOCATION USING SENSOR-BASED BEHAVIOR RECOGNITION

TECHNICAL FIELD

The present disclosure relates to a user terminal device and method for recognizing a user's location in a user space.

BACKGROUND ART

With development of information and communication technologies and spread of the Internet of things (TOT), interest in a wearable device has been growing. The wearable device refers to a computer device that can be worn on a user's body, and includes various sensors. By computing data from various sensors and grasping what situation a user is in through the wearable device, it is possible to provide various IoT-based services. Therefore, researches have been actively conducted on how to use the wearable device in recognizing environments of a user. Recently, various kinds of wearable device have been released as products which are commercial but not for research purposes.

A conventional technique for grasping a user's activity or location information is classified according to sensors used therein, and the used sensor is also classified into two types according to positions of the sensor. A first technique refers to a method of using the sensor depending on an infrastructure where the sensor is installed in a space. In a large space, an inexpensive sensor such as a passive infrared sensor for intruder detection or an ultrasonic sensor is installed, or recording is performed with a camera to collect data, and a wireless signal transceiver is used for tomography. In this method, a user's location can be grasped only in a place where the sensor is directly installed. A second technique refers to a method in which a user carries a device mounted with a sensor. In this method, a user attaches the sensor to user's body, carries a smart phone, or wears a wearable device, on conditions that the sensor is near user. An inertial sensor for sensing acceleration or rotational angular velocity is generally used, and a module for reading a radio frequency identification (RFID) signal, a network module for collecting a wireless fidelity (Wi-Fi) signal, or the like may be used. For example, an RFID tag is used, or a W-Fi module of the smart phone is used.

However, the foregoing conventional techniques have problems as follows. First, the method of installing the sensors in the infrastructure requires necessary sensors to be mounted all over a house, and thus a practical problem arises in relation to costs and installation. Although concept of smart homes has been introduced with the spread of the IoT, it does not reach a level of installing the ultrasonic sensors or the cameras throughout the house yet, and may cause additional costs even if possible. Second, the method of using the smart phone has currently been widely used, there is a limit when a user is located inside the house. For example, the smart phone may not directly obtain information about a user's motion since it is likely to be charging or be not carried while user is located inside the house. Last, the conventional location grasping method of using the wearable device has a problem of consuming much power since it periodically collects a Wi-Fi signal. Since the wearable device has relatively small battery capacity, it is not suitable for collecting the Wi-Fi signal and grasping a user's location. Further, the wearable device cannot sufficiently show its ability in terms of hardware and software since it has a limited size.

DISCLOSURE

Technical Problem

Accordingly, to solve the problems of the related art, an aspect of the present disclosure is to provide a user terminal device and method for grasping a user's location using information from a built-in sensor of a wearable device.

Another aspect of the present disclosure is to provide a user terminal device and method for recognizing a user's location inside a house without an infrastructure that requires a plurality of sensors to be installed.

Still another aspect of the present disclosure is to provide a user terminal device and method for recognizing a user's location even though a user does not always carry a smart phone inside a house.

Still another aspect of the present disclosure is to provide a user terminal device and method for determining whether a smart phone is near a user, and recognizing a user's location inside a house by using position information of the smart phone as an aid.

Still another aspect of the present disclosure is to provide a user terminal device and method for building a learning model with low costs to recognize a user's location inside a house.

Technical Solution

In accordance with an embodiment of the present disclosure, a user terminal device for recognizing a user location using sensor-based activity recognition is provided including: a communication module configured to receive activity information from a mobile device that senses information about at least one of a user state and surrounding environments, and extracts the activity information based on the sensed information; and a processor configured to determine a user location in a user space corresponding to a user activity based on the received activity information.

The mobile device may include at least one of a wearable device and a mobile phone.

The user terminal device may include at least one of a mobile phone, a notebook PC, a tablet PC, a PDA, a desktop PC, and a server.

The mobile device may include a first sensor module including at least one of an acceleration sensor, a microphone, a heart-beat pulse sensor, a gyroscope, a geomagnetic sensor, a gravity sensor, an optical sensor, a digital compass, an odor sensor, and a proximity sensor.

The user terminal device may include a second sensor module including at least one of an acceleration sensor, a microphone, a gyroscope, a geomagnetic sensor, a gravity sensor, an optical sensor, a digital compass, an odor sensor, and a proximity sensor.

The mobile device may extract first activity information based on first sensed information sensed by the first sensor module, and the processor may extract second activity information based on second sensed information sensed by the second sensor module, and determine a user location based on the first activity information and the second activity information.

The communication module may include a Bluetooth communication module, and the processor may measure a distance between the mobile device and the user terminal device based on signal strength of Bluetooth communication with the mobile device.

The communication module may include a Wi-Fi communication module, and the processor may determine that a user and the user terminal device are in the same location when the distance between the mobile device and the user terminal device is within a predetermined range, and determine a user terminal location obtained by a Wi-Fi-based positioning system (WPS) as a user location.

The activity information may include an activity fingerprint generated based on raw sense data obtained from the first sensor module.

The activity fingerprint may be generated by a clustering algorithm based on features extracted from the raw sense data.

The processor may determine a user location using a statistics Markov model based on the activity fingerprint.

The processor may further include a storage configured to store the activity fingerprint corresponding to the user location as a learning model in association with the user location.

The user terminal device may further include a storage configured to store user activity history data in which user activity corresponding to the activity information is associated with activity time.

The processor may control an electronic device arranged in the user location.

In accordance with an embodiment of the present disclosure, a system for recognizing a user location using sensor-based activity recognition is provided including: a mobile device which includes a sensor module configured to sense information about at least one of a user state and surrounding environments, a first processor configured to extract activity information based on the sensed information, and a first communication module configured to transmit the extracted activity information; and a user terminal device which includes a second communication module configured to receive the activity information from the first communication module, and a processor configured to determine a user location in a user space corresponding to a user activity based on the received activity information.

In accordance with another embodiment of the present disclosure, an system for recognizing a user location using sensor-based activity recognition is provided including: a first mobile device which includes a sensor module configured to sense information about at least one of a user state and surrounding environments, a first processor configured to extract activity information based on the sensed information, and a first communication module configured to transmit the extracted activity information; a second mobile device which includes a second communication module configured to perform Wi-Fi communication and Bluetooth communication, and a second processor configured to obtain its own location information through the Wi-Fi communication and obtain distance information from the first mobile device through the Bluetooth communication; and a user terminal device which includes a third communication module configured to receive the activity information from the first communication module and the location information and the distance information from the second communication module, and a third processor configured to determine the location information as a user location when the first mobile device and the second mobile device are within a predetermined distance based on the distance information, and determine a user location in a user space corresponding to a user activity based on the received activity information when the first mobile device and the second mobile device are beyond a predetermined distance.

In accordance with an embodiment of the present disclosure, a method of recognizing a user location using sensor-based activity recognition is provided including: by a mobile device, sensing information about at least one of a user state and surrounding environments; extracting activity information based on the sensed information; transmitting the activity information to a user terminal device; and determining a user location in a user space corresponding to the activity information based on the received activity information.

The method of recognizing a user location may further include determining whether a user is in the same location as the user terminal device through Bluetooth communication between the mobile device and the user terminal device; and determining that the location of the user device terminal as a user location in a user space through Wi-Fi communication of the user terminal device when the user is in the same location as the user terminal device.

The method of recognizing a user location may further include: by the user terminal device, sensing second information about at least one of a user state and surrounding environments; by the user terminal device, extracting second activity information based on second information; and determining a user location in the user space corresponding to user activity based on the first activity information and the second activity information.

In accordance with an embodiment of the present disclosure, a recording medium is capable of recording a program of determining the user location in the user space corresponding to the user activity based on the activity information.

Advantageous Effects

In smart home environments, to which the IoT is applied, a user's location or activity information may be grafted onto a service for user convenience. In particular, a location is grasped based on a user's activity information, and it is therefore possible to recognize a situation about which room the user is in and what activity the user does. Through recognition of a user's situation, it is possible to analyze a user's lifestyle at home, and provide a situation-customized service to a user.

That it is possible to grasp through the smart watch when and where a user was and what a user did in home is directly connected to that it is possible to know a life pattern about how a user is. The activity determinable in the present disclosure is about activities including a general activity performed in home such as watching TV, reading book, sleeping, using PC, and the like; a sanitary activity performed in home such as cleaning, taking a shower, cooking, eating, washing dishes, drying hair, hanging out laundry, and the like; and an activity of interacting with other people, such as talking, making and drinking coffee, etc. In respect of grasping which room such an activity is done, it is possible to determine a user's situation in detail.

Since it is possible to obtain information about when and where each activity of a user is done, a user's lifestyle is analyzed. For example, it is possible to determine a user's life pattern from time when the user wakes up in the morning to time when the user goes to bed, such as what time a user gets up ordinarily, what activity a user generally does according to timeslots, etc. Therefore, when data is collected for a sufficient period of time, it is possible to predict what activity a user will do. By providing a necessary service based on prediction of a user's activity, it will be convenient for a user.

Through the prediction of a user's activity, it is possible to continuously provide a service. For example, a user who is wearing the smart watch is waken up in the morning by vibrating a user's wrist, and the light of the room which a user is in is turned on. Until the user goes to the bathroom, the user will be periodically waken up not to oversleep. While the user washes the face and dries the hair, a coffee maker with an IoT function will prepare morning coffee for a user. After washing face and having breakfast, a TV is automatically turned on to show morning news.

The present disclosure may be very suitably applied to situations where activities of daily living has to be periodically checked in home like those for an old man, a disabled person, and a dementia patient. In fields of determining whether they can live independently without a protector, independency is determined through what activities such as eating, taking a shower, movement, etc. they do. According to the present disclosure, it is possible to grasp what activities a user is doing and where the user is, remote monitoring is possible without building an infrastructure and taking an image. Further, information collected from a user does not invade the user's privacy, and thus it is advantageously easier to be commercialized than a conventional one. For example, the smart watch does not collect any pieces of image information and analyzes the features by a process in which sound restoration is impossible, thereby operating without an invasion of privacy.

DESCRIPTION OF DRAWINGS

FIG. 3 is a table of showing a relationship between electronic devices and corresponding spaces in a house, FIGS. 4 and 5 are tables of showing a relationship between spaces and activities according to users, FIG. 20 is a graph of showing accuracy in estimation according to spaces in a house.

BEST MODE

Figure 1:
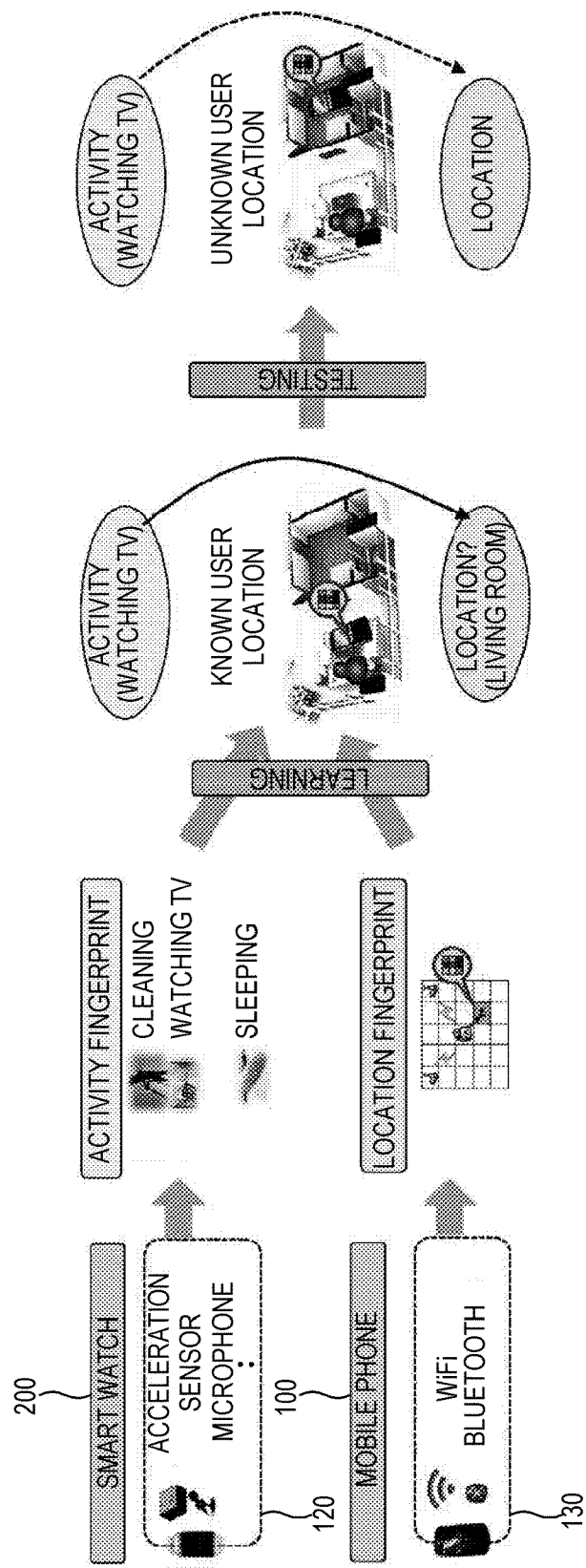
FIG. 1 is a schematic view of showing a scenario of an activity-based location recognizing system according to one embodiment of the present disclosure.

Below, embodiments of the present disclosure will be described with reference to accompanying drawings. The following embodiments have to be considered as illustrative only, and it should be construed that all suitable modification, equivalents and/or alternatives fall within the scope of the disclosure. Throughout the drawings, like numerals refer to like elements.

In this specification, "have," "may have," "include," "may include" or the like expression refer to presence of the corresponding features (e.g.: numerical values, functions, operations, or elements of parts, and does not exclude additional features.

In this specification, "A or B," "at least one of A or/and B," "one or more of A or/and B" or the like expression may involve any possible combination of listed elements. For example, "A or B," "at least one of A and B," or "at least one A or B" may refer all of (1) at least one A, (2) at least one B, or (3) both at least one A and at least one B.

In this specification, "a first," "a second," "the first," "the second" or the like expression may modify various elements regardless of order and/or importance, and does not limit the elements. These expressions may be used to distinguish one element from another element. For example, a first user device and a second user device are irrelevant to order or importance, and may be used to express different user devices. For example, a first element may be named a second element and vice versa without departing from the scope of the disclosure.

If a certain element (e.g. the first element) is "operatively or communicatively coupled with/to" or "connected to" a different element (e.g. the second element), it will be understood that the certain element is directly coupled to the different element or coupled to the different element via another element (e.g. a third element). On the other hand, if a certain element (e.g. the first element) is "directly coupled to" or "directly connected to" the different element (e.g. the second element), it will be understood that another element (e.g. the third element) is not interposed between the certain element and the different element.

In this specification, the expression of "configured to" may be for example replaced by "suitable for," "having the capacity to," "designed to," "adapted to," "made to," or "capable of" in accordance with circumstances. The expression of "configured to" may not necessarily refer to only "specifically designed to" in terms of hardware. Instead, the "device configured to" may refer to "capable of" together with other devices or parts in a certain circumstance. For example, the phrase of "the processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

In this specification, terms may be used just for explaining a certain embodiment and not intended to limit the scope of other embodiments. A singular expression may involve a plural expression as long as it does not clearly give different meaning contextually. All the terms set forth herein, including technical or scientific terms, have the same meanings as those generally understood by a person having an ordinary skill in the art. Terms defined in a general-purpose dictionary may be construed to have the same or similar meanings as the contextual meanings of the related art, and should not be interpreted as ideally or excessively formal meanings. As necessary, even the terms defined in this specification may be not construed to exclude the embodiments of the present disclosure.

FIG. 1 is a schematic view of showing a scenario of an activity-based location recognizing system 1 according to one embodiment of the present disclosure.

Referring to FIG. 1, the activity-based location recognizing system 1 recognizes a location of a dweller or a user (hereinafter, referred to as a 'user') in environments of a specific space such as a home, a structure, a building, an office, etc. without building an additional infrastructure. Of course, it is possible to recognize a user's location based on an activity even in a roofless park or the like besides the home, the structure, the building, the office, etc. The activity-based location recognizing system 1 includes a user terminal device 100 and a mobile device 200. The user terminal device 100 may be materialized by a mobile phone, a notebook personal computer (PC), a tablet PC, a personal digital assistant (PDA), a desktop PC, a server, etc. The mobile device 200 may be achieved by a wearable device such as a smart watch, a wearable band, smart glasses, a headset, etc. According to one embodiment of the present disclosure, a widespread mobile phone 100 was employed for the user terminal device 100, and a wrist-wearable smart watch 200 was employed for the mobile device 200 as a universal wearable device for monitoring a user's activity and movement in a daily life. The mobile phone 100 and the wrist-wearable smart watch 200 have been increasingly used in a commercial market, and there are no difficulties for a user to use or wear them. Further, it will be assumed that the mobile phone 100 and the smart watch 200 are worn on a user always except in some situations, e.g. charging, sleeping, showering, etc.

The activity-based location recognizing system 1 traces a user by the following methods. The smart watch 200 monitors a user's movement, and employs a triaxial acceleration sensor 230-1 to generate an activity fingerprint of an arm motion, and a microphone 230-2 to measure a sound of surrounding environments or activities. A user's activity may include cleaning, watching TV, sleeping, showering, eating, using PC, cooking, washing dish, drinking tea, talking, washing face, relieving him/herself, reading, picking laundry, folding laundry, drying hair, making coffee, etc. The mobile phone 100 periodically performs Wi-Fi location tracking based on Wi-Fi received signal strength (RSS) to recognize a "room" location of a device. Distance measurement and data exchange between the mobile phone 100 and the smart watch 200 are periodically performed through Bluetooth communication. When it is determined based on distance measurement that a user is near user's mobile phone, a user's current location is determined as a recognized position of the mobile phone 200 from a Wi-Fi positioning system (WFPS). The room location information and the activity fingerprint are added to a learning sample for learning an inference model of considering a correlation between a space and an activity. By the way, when a user is distant from the mobile phone 100, the activity-based location recognizing system 1 determines a user's location from the inference model of finding a space in a house having a higher correlation with an activity observed by the smart watch 200. In the activity-based location recognizing system 1 of the present disclosure, extraction features and location inference may be performed in either of the mobile phone 100 or the smart watch 200. A feature vector may be generated in the smart watch 200 and transmitted to the mobile phone 100. However, learning and estimation based on the activity fingerprint may be performed in the mobile phone 100 when a limited resource and limited computing ability of the wearable device are taken into account.

Figure 2:
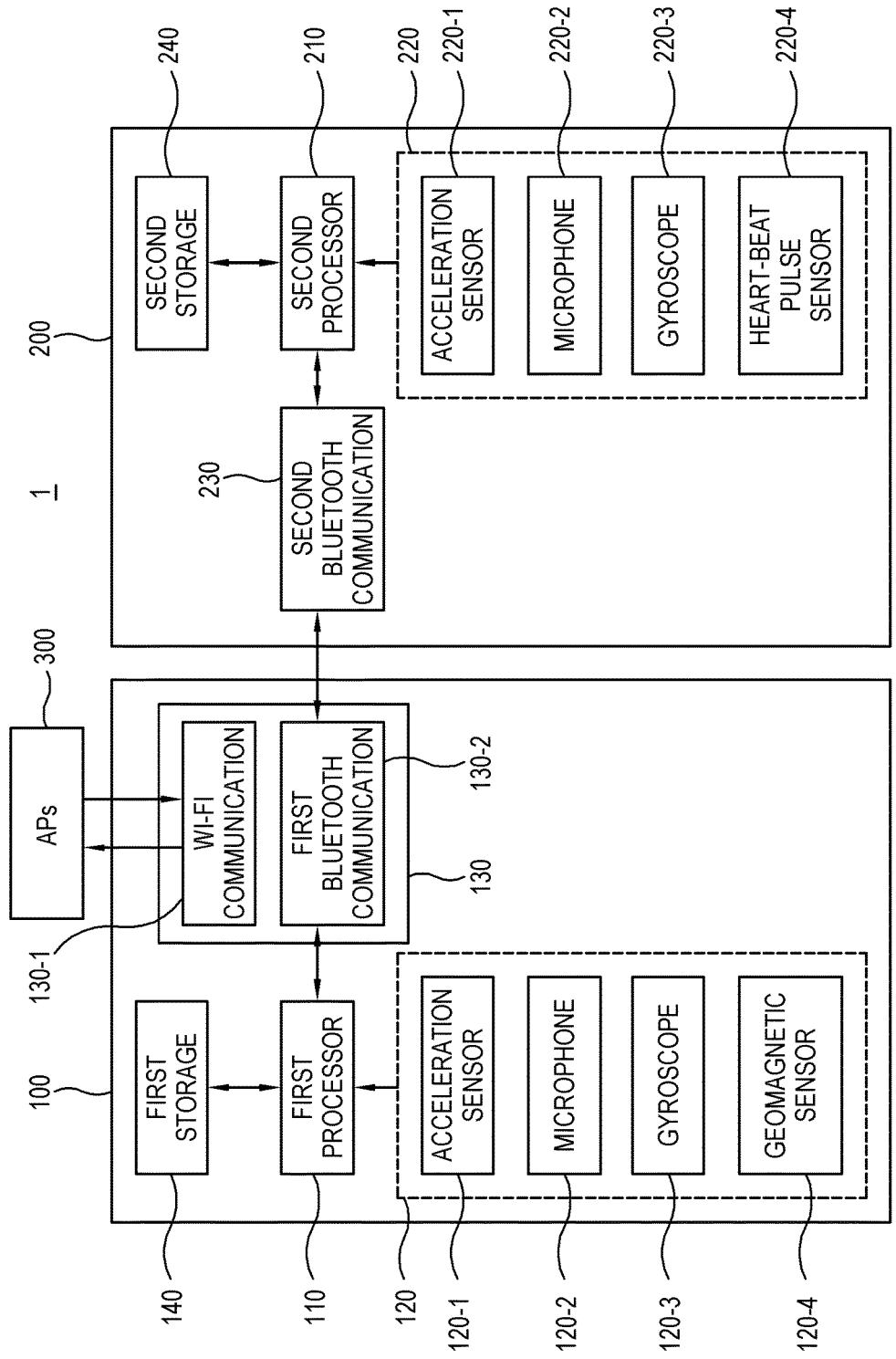
FIG. 2 is a block diagram of a user terminal device for recognizing a user's location using sensor-based activity recognition according to one embodiment of the present disclosure.

FIG. 2 is a block diagram of an activity-based location recognizing system 1 according to one embodiment of the present disclosure, which includes a user terminal device 100, a mobile device 200 and a wireless router access point (AP) 300.

The user terminal device 100 includes a first processor 110, a first sensor module 120, a first communication module 130 and a first storage 140. The user terminal device 100 may include additional elements such as a signal processor, a display, a user input, etc. in addition to the foregoing elements.

The first processor 110 is materialized by a control board that includes a central processing unit (CPU), a micro processing unit (MPU), application specific integrated circuits (ASICs), digital signal processors (DSPs), digital signal processing devices (DSPDs), a programmable logic devices (PLDs), a field programmable gate arrays (FPGAs), micro-controllers, microprocessors, etc. The first processor 110 generally controls the elements of the user terminal device 100, e.g. the first sensor module 120, the first communication module 130, the first storage 140, etc. and processes various pieces of information received, input or sensed from the smart watch 200 or an external device using a network, e.g. a server by software or hardware. The first processor 110 may include an operating system (OS), e.g. Android version 5.0 (lollipop). Further, the first processor 110 may include an application (program) for recognizing a user's location at a user space position based on information received from the mobile phone 200, e.g. first sensed information obtained by sensing at least one among pieces of information about a user's condition and surrounding environments in the first sensor module 120 of the mobile phone 200. The first processor 110 may recognize a user's location, e.g. a living room for watching a TV in the user space location corresponding to the received first sensed information, and control the TV placed in the living room or provide information to the TV so that the TV can provide a service suitable for a user.

The first sensor module 120 includes a triaxial acceleration sensor 120-1, a microphone 120-2, a gyroscope 120-3, a geomagnetic sensor, a gravity sensor, an optical sensor, a digital compass, an odor sensor, a proximity sensor, etc. Of course, the sensor module 120 may further include other sensors in addition to the foregoing sensors.

The triaxial acceleration sensor 120-1 monitors upward, downward, leftward and rightward movement of the device. The triaxial acceleration sensor 120-1 obtains a motion vector by sensing a user's number of walking steps (the amount of movement) or a user's moving direction.

The microphone 120-2 measures a sound involved in an activity of a user, e.g. a water sound at showering, a speaking voice at language study, a conversation sound at talking, etc. These measured sounds are used in estimating a location in a user space.

The gyroscope 120-3 is a device used for measuring or maintaining orientation based on the conservation of angular momentum. An orientation of a quickly spinning wheel is maintained regardless of inclination of a system even though a frame of the system is inclined in accordance with momentum of the quickly spinning wheel. The gyroscope is classified into a mechanical gyro, an optical gyro, a micro gyro. The mechanical gyro is based on the Coriolis effect of a rotating or vibrating object and includes a vibration gyro. The optical gyro is based on the Sagnac effect and includes a ring laser gyro (RLG) and a fiber optic gyro (FOG). The micro gyro is a gyro miniaturized to have a several mm size by a semiconductor process technique and is generally based on the principle of a vibration gyro.

The geomagnetic sensor 120-4 is a sensor that shows a direction like a compass. The geomagnetic sensor 120-4 is used in showing a direction of a desired district or drawing an augmented reality map showing a map with respect to a user's current location.

The gravity sensor is a sensor for sensing the gravity direction, which is mounted to an electronic device or the like, detects which direction the gravity acts, and provides convenience of a device user in accordance with situations. For example, when the mobile phone 100 with the gravity sensor is rotated in a horizontal direction, a picture image is in a landscape orientation to be easily shown to a user. The gravity sensor has been applied to an information technology (IT) device such as a mobile phone, an MP3 player, etc., but may be also mounted to a driving recorder (e.g. a black box) for a vehicle and records a direction when a car crash.

The optical sensor is a sensor of using light to sense motion or temperature.

The digital compass is a sensor for detecting a direction.

The odor sensor is a sensor for sensing an odor, which uses change generated when odor molecules are attached to a material and is classified into a semiconductor type, a conductive high-molecular type, a quartz vibrator type, and a bio receptor. The basic principle of the odor sensor is to pattern a signal generated when odor molecules are attached to a material.

The proximity sensor is a sensor for sensing an object approaching a sensing surface of a switch or presence of a near object through an electromagnetic field without mechanical contact.

The first communication module 130 includes a Wi-Fi communication module 130-1, and a Bluetooth communication module 130-2. In addition, the first communication module 130 may include a wireless Internet module such as 2G, 3G, 4G, long term evolution (LTE) and the like mobile communication, wireless broadband (Wibro), world interoperability for microwave access (Wimax), high speed downlink packet access (HSDPA), etc.; and a near field communication module such as a radio frequency identification (RFID), infrared data association (IrDA), ultra-wideband (UWB), ZigBee, etc.

The Wi-Fi communication module 130-1 performs wireless Internet communication through a wireless router 300. According to the present disclosure, it is possible to accurately determine the location of the mobile device 100 through location information between the wireless routers 300 and the mobile device 100.

The Bluetooth communication module 130-2 performs data communication with the smart watch 200. The Bluetooth communication module 130-2 measures a distance between the mobile device 100 and the smart watch 200 based on signal strength of Bluetooth communication. In this case, it is determined that the mobile device 100 and the smart watch 200 are present in the same location when a Bluetooth signal strength range is in a specific range. That is, the same location indicates that a user carries the mobile device 100 on the assumption that s/he always wears the smart watch 200.

The first storage 140 is configured to store data without limitations. The first storage 140 is accessed by the processor 110, and the data is subject to reading, writing, modifying, deleting, updating, etc. by them. The data stored in the first storage 140 for example includes raw sense data sensed in the first sensor module 120 of a user; features extracted using the raw sense data by the first processor 110; first activity fingerprint data produced by the extracted features, second activity fingerprint data received from the smart watch 200 through the first communication module 200, a space location database related to a first activity fingerprint, a space location database related to a second activity fingerprint, a space location database related to a location fingerprint, an activity fingerprint database corresponding to a location fingerprint, an activity fingerprint-location fingerprint-electronic device use history database related to a user's activity, etc. Of course, the first storage 140 is configured to store an operating system, various applications executable under the operating system, image data, appended data, etc.

The first storage 140 may include at least one type of storage media such as a flash memory type, a hard disk type, a multimedia card micro type, a card type memory (e.g., an secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The smart watch 200 includes a second processor 210, a second sensor module 220, a second communication module 230, and a second storage 240. The smart watch 200 may include other additional elements such as a signal processor, a display, a user input, etc. in addition to the elements.

The second processor 210 is materialized by a control board that includes a central processing unit (CPU), a micro processing unit (MPU), application specific integrated circuits (ASICs), digital signal processors (DSPs), digital signal processing devices (DSPDs), a programmable logic devices (PLDs), a field programmable gate arrays (FPGAs), micro-controllers, microprocessors, etc. The second processor 210 generally controls the elements of the smart watch 200, e.g. the second sensor module 220, the second communication module 230, the second storage 240, etc. and processes various pieces of information received, input or sensed from the user terminal device 100 by software or hardware. The second processor 210 may include an operating system (OS), e.g. Android version 5.0 (lollipop). Further, the second processor 210 may include an application (program) for receiving second sensed information obtained by sensing at least one among pieces of information about a user's condition and surrounding environments in the second sensor module 220, extracting features from the second sensed information, and generating an activity fingerprint from the extracted features.

The second sensor module 220 includes a triaxial acceleration sensor 220-1, a microphone 220-2, a gyroscope 220-3, a heart-beat pulse sensor 220-4, a geomagnetic sensor, a gravity sensor, an optical sensor, a digital compass, an odor sensor, a proximity sensor, etc. Of course, the second sensor module 220 may further include other sensors in addition to the foregoing sensors.

The triaxial acceleration sensor 220-1 monitors upward, downward, leftward and rightward movement of the device. The triaxial acceleration sensor 220-1 obtains a motion vector by sensing a user's number of walking steps (the amount of movement) or a user's moving direction.

The microphone 220-2 measures a sound involved in an activity of a user, e.g. a water sound at showering, a speaking voice at language study, a conversation sound at talking, etc. These measured sounds are used in estimating a user's location in a space.

The gyroscope 220-3 is a device used for measuring or maintaining orientation based on the conservation of angular momentum. An orientation of a quickly spinning wheel is maintained regardless of inclination of a system even though a frame of the system is inclined in accordance with momentum of the quickly spinning wheel.

The heart-beat pulse sensor 220-4 senses heart-beat pulses based on a difference in minute changes of infrared light emitted to a blood vessel of a wrist in accordance with changes in the pressure of the blood vessel.

The geomagnetic sensor is a sensor that shows a direction like a compass. The geomagnetic sensor is used in showing a direction of a desired district or drawing an augmented reality map showing a map with respect to a user's current location.

The gravity sensor is a sensor for sensing the gravity direction, which is mounted to an electronic device or the like, detects which direction the gravity acts, and provides convenience of a device user in accordance with situations. For example, when the smart watch 200 with the gravity sensor is rotated in a horizontal direction, a picture image is in a landscape orientation to be easily shown to a user.

The optical sensor is a sensor of using light to sense motion or temperature.

The digital compass is a sensor for detecting a direction.

The odor sensor is a sensor for sensing an odor, which uses change generated when odor molecules are attached to a material and is classified into a semiconductor type, a conductive high-molecular type, a quartz vibrator type, and a bio receptor. The basic principle of the odor sensor is to pattern a signal generated when odor molecules are attached to a material.

The proximity sensor is a sensor for sensing an object approaching a sensing surface of a switch or presence of a near object through an electromagnetic field without mechanical contact.

The second communication module 230 includes a Bluetooth communication module 230. In addition, the second communication module 230 may include a wireless Internet module such as 2G, 3G, 4G, long term evolution (LTE) and the like mobile communication, wireless broadband (Wibro), world interoperability for microwave access (Wimax), high speed downlink packet access (HSDPA), etc.; and a near field communication module such as a radio frequency identification (RFID), infrared data association (IrDA), ultra-wideband (UWB), ZigBee, etc. However, in case of the smart watch 200, it will be assumed that only the Bluetooth communication module 230 is used in consideration of the limited size of the smart watch 200 or the limited processing ability of the second processor.

The Bluetooth communication module 230 performs data communication with the user terminal 100. The Bluetooth communication module 230 measures a distance between the mobile device 100 and the smart watch 200 based on signal strength of Bluetooth communication. In this case, it is determined that the mobile device 100 and the smart watch 200 are present in the same location when a Bluetooth signal strength range is in a specific range. That is, the same location indicates that a user carries the mobile device 100 on the assumption that s/he always wears the smart watch 200.

The second storage 240 is configured to store data without limitations. The second storage 240 is accessed by the processor 110, and the data is subject to reading, writing, modifying, deleting, updating, etc. by them. The data stored in the second storage 240 for example includes raw sense data sensed in the second sensor module 220; features extracted using the raw sense data by the second processor 210; and second activity fingerprint data produced by the extracted features. Of course, the second storage 240 is configured to store an operating system, various applications executable under the operating system, appended data, etc.

The second storage 240 may include at least one type of storage media such as a flash memory type, a hard disk type, a multimedia card micro type, a card type memory (e.g., an secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The wireless router (e.g. an access point (AP)) 300 is a low power wireless device that serves as a base station in a wireless local area network (LAN), and used as a bridge of connecting a wired network and a wireless network. In light of the wired network, the router 300 is attached to a router, a switch or the like, and the router or switch does not recognize a wireless station and entirely depends on the router 300. Therefore, the router 300 serves to extend the wired network to the wireless network.

Below, a method of recognizing a user's location based on activity will be described in detail in accordance with one embodiment of the present disclosure. The second sensor module 220 applied to the smart watch 200 will be described including only the triaxial acceleration sensor 220-1 and the microphone 220-2, but may include any kind of sensor.

The smart phone, wearable device, or the like smart watch 200 is always used for recognizing a user's activity. The triaxial acceleration sensor 220-1 is used for sensing walking, corridor change, going upstairs and the like physical activity; sensing a user's motion after falling; and monitoring a user's activity level for a diet through the mobile phone. The triaxial acceleration sensor 220-1 is used in tracing the number of walking steps, sleeping hours, calorie consumption, and the like user activity. The microphone 220-2 is used in monitoring a user's activity. A body score uses a sound sensor around a neck and analyzes the sounds to recognize eating, drinking and talking activities. According to one embodiment of the present disclosure, a user terminal device 200 for recognizing a user's location based on activity automatically learns and evaluates a user's location without manual building. To analyze a relationship between the activity and the location (e.g. a room), a mobile phone application was used to collect general activity and corresponding location of two users (A and B) for three weeks. Further, the smart watch application was used to manually build the current activity and a location in a house periodically.

A user's activity very largely depends on a space in which the user is located. For example, "watching TV" and "sitting on a sofa" and the like activity are typically observed in a living room. Likewise, eating and drinking and the like meal-related activity are observed in a dining room table. FIG. 3 to FIG. 5 show a list of spaces within a house, locations of electronic devices and activity in home environments. As shown therein, ten activities (59%) among seventeen activities of a user A and twelve activities (86%) among seventeen activities of a user B are dependent on independent rooms, but most activities are observed in one or more spaces in the house. This means that locations of people in the home environments are inferable from recognition of a user's specific activity.

However, several activities are not dependent on a specific space in the house. For example, cleaning, laundry-picking and the like activities are observed in many spaces since a cleaning machine, a washing machine and the like electronic devices are not stationarily provided. Further, some activity types are observed in different spaces in the house in case of different users or when there are many electronic devices of the same type. In result, a correlation between the space and the activity is varied depending on users, activity types and electronic devices installed in the home environments.

The triaxial acceleration sensor 220 of the smart watch 200 measures acceleration of a wrist and thus recognizes physical features of the activity. However, when the smart watch 200 is worn on one wrist, it is impossible to recognize the activity of the other wrist, and the recognition of the activity is insufficient. For example, there may be a case where a right hand is used in drinking a beverage in the state that the smart watch 200 is worn on a left hand. Further, only the acceleration sensor 220-1 is not enough to recognize some activities. For example, since watching TV on a table, reading and drinking beverage belong to a sedentary activity, similar problems arise in measurement of the acceleration sensor. To solve these problems, an activity or room-sound features extracted using the microphone 220-2 of the smart watch 200 are taken into account together with the motion features recognized by the acceleration sensor 220-2.

As shown in FIGS. 4 and 5, dependence on an activity in a house space is varied depending on people and types of activity. Further, people are different in physical characteristics (e.g. age, height and weight) and habits, and therefore behave variously even though they are humans. Accordingly, a personal learning mechanism is required to assort human activities.

To determine a user's location based on activity recognition, a correlation between an activity and a space has to be learned. Further, such a learning process has to be personally performed since it depends on users. However, considerable efforts are needed to manually build the current location of each individual user, and thus there is a need of a learning method of automatically building a user's location. Accordingly, one embodiment of the present disclosure proposes an automatic learning method of using the smart watch 200 and the mobile phone 10. That is, a user location recognition system 1 is developed using sensor-based activity recognition to automatically extract features of a user's activities and learn the correlation between the space and the activity in a daily life.

Figure 6:
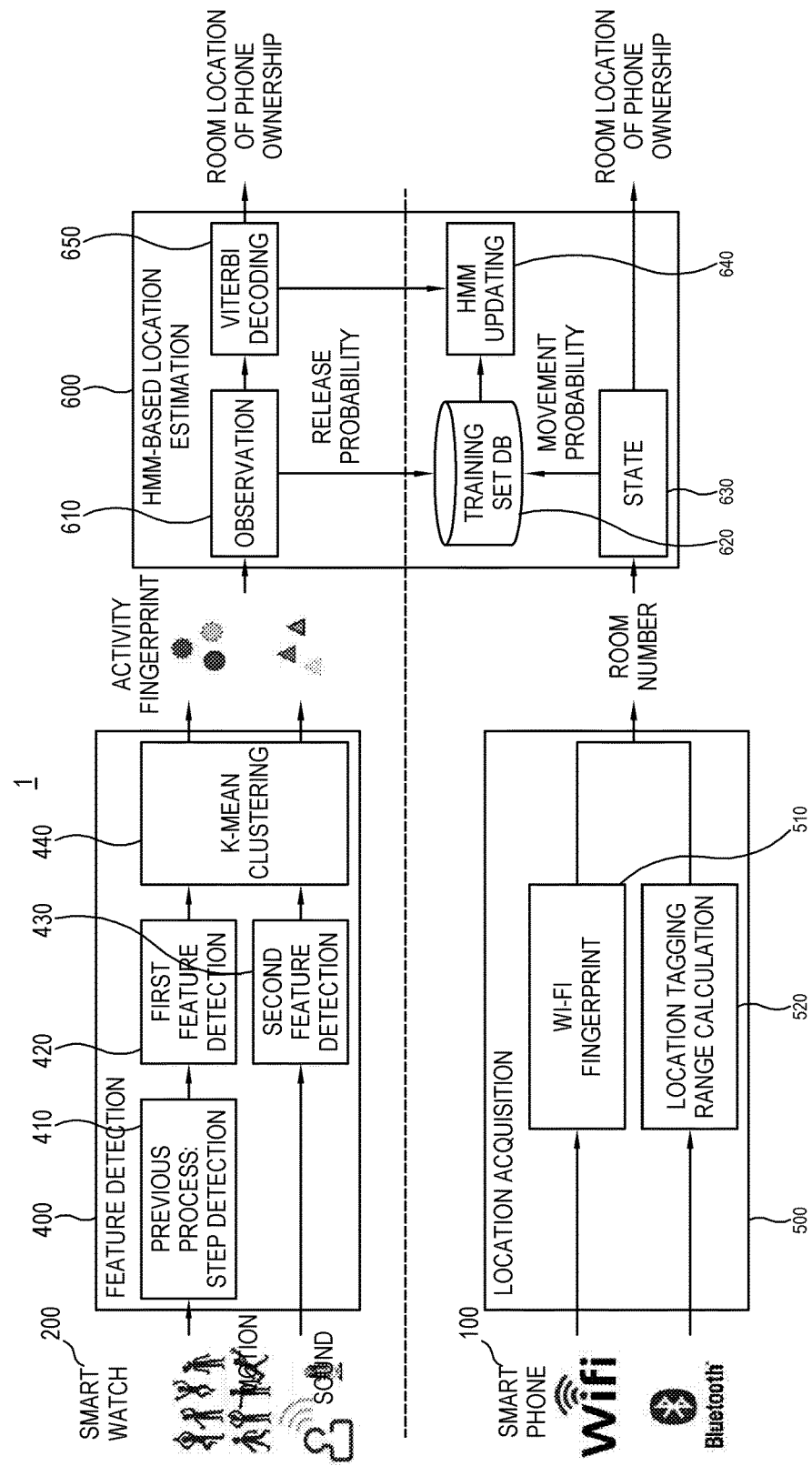
FIG. 6 is a schematic view of showing a process of recognizing a user's location using the sensor-based activity recognition according to one embodiment of the present disclosure.

FIG. 6 is a block diagram of showing a functional structure of the user location recognition system 1 using the sensor-based activity recognition, which includes an activity fingerprint generator 400, a position acquirer 500 and an HMM-based position recognizer 600.

First, the activity fingerprint generator 400 previously processes raw sensor data to detect movement of a user from an input in the acceleration sensor of the smart watch 200. Then, activity fingerprints are extracted from various pieces of sensor data. The extracted features are transmitted to the mobile phone 100 or the server through the Bluetooth communication module 230. Herein, the server refers to a computer that is connected to a network and established to recognize user locations in home environments corresponding to a plurality of users, provide proper services to the users, and control the electronic devices involved in the activities. The server may be materialized by a PC, a desktop PC, a notebook PC, etc. and may be established at every house.

The position acquirer 500 may be materialized by the mobile phone 100. The mobile phone 100 periodically senses signal strength from near Wi-Fi routers, and obtains their locations based on Wi-Fi fingerprint technology. Further, the mobile phone 100 calculates a distance through the smart watch 200 paired to determine whether a user is in the same location.

The HMM-based position recognizer 600 is based on statistics Markov Model, e.g. hidden Markov Model (HMM), and divided into two parts. The first part is a learning stage of an inference model of when the mobile phone 100 is present in the same location as a user within one space. The first part is automatically established with enough learning samples, and updates an HMM-based inference model. The second part determines a user's location based on an activity fingerprint obtained from the smart watch 200.

Below, the user location recognition method using the sensor-based activity recognition will be described in detail with reference to FIGS. 6 to 24.

As shown in FIG. 6, the activity fingerprint generator 400 includes a preprocessor 410, a first feature extractor 420, a second feature extractor 430, and a clustering section 440.

The recognition of a user's location in the home environment by activity recognition is based on a previous condition that a recognized activity has to be performed in a related space. The preprocessor 410 detects movement states of users to apply filtering to the activities while users are moving around (e.g. for cleaning) Further, a user's long movement indicates change in the user's location, and the time when the user's location is updated is thus estimated based on measurement of a moving distance. The movement states include three kinds of state, i.e. stopped, moving, and unknown states (when a user does not wear the smart watch). Herein, the moving distance and the movement state are measured based on the number of walking steps. As an algorithm for detecting the number of walking steps using the acceleration sensor 220-1, a publicly known technique will be employed. The number of walking steps is counted up based on peak detection of the acceleration sensor 220-1 in the smart watch 200 used for marking coordinate stepping points. When $\Delta T_{min}$ and $\Delta T_{max}$ are respectively defined as the minimum time and the maximum time between continuous acceleration peaks, and two or more peaks are measured within $\Delta T_{min}$, only one peak is taken as one walking step into account and other peaks are discarded to prevent an error of positive detection. On assumption that a normal user takes three or less steps per second in home, $\Delta T_{min}$ is set to 0.33. When two or more steps are counted up within $\Delta T_{max}$ (e.g. 2 seconds), the movement state is determined as the "moving state". Besides, when no peaks are detected during $\Delta T_{max}$, the movement state is determined as the "stopped state". In addition, when there are no changes during $\Delta T_{max}$ (e.g. when standard deviation in the measurement is lower than or equal to 0.05 g), it is determined that the smart watch 200 is not worn and the movement is the "unknown state". The smart watch 200 starts monitoring when the movement state is changed from the "moving state" to the "stopped state".

The feature extractors 420 and 430 extract two types of information, i.e. movement information and sound information, obtained from the smart watch 200. For example, a movement feature indicates an arm motion among the activities, and a sound feature indicates a sound made by the activity as well as surrounding sounds in a location.

Through the measurement of the acceleration sensor 220-1, the movement feature is obtained by capturing a motion feature of a posture and repetitive arm movement. To monitor the activity, a sliding window of about 5 s was used, and measurements were collected at a ratio of 50 Hz or higher. The window is overlapped by 50% with the previous sliding window. Once the sliding window is filled with the measurements, the following movement features are obtained.

(1) Average and standard deviation vectors: 3D average and standard deviation vectors are calculated from an acceleration signal in the window (including a 5-s window including 512 frames). As N acceleration measurement samples, the average and standard deviation vectors are expressed by the following expression [1] and expression [2].

$$M_t(a) = \frac{1}{N} \sum_{j=t-N-1}^{t} a_i(j), (i = x, y, \text{ and } z),$$ [Expression 1]

$$S_t(a) = \left[ \frac{1}{N-1} \sum_{j=t-N-1}^{t} (a_i(j) - a_i)^2 \right]^{1/2}.$$ [Expression 2]

(2) Tilting angle: a tilting angle is defined by an angle between a positive z-axis and a gravity vector g. The tilting angle is used to distinguish between postures, and calculated by the following expression [3].

$$\text{angle}_{tilt} = \text{arc cosine}(z).$$ [Expression 3]

(3) Energy: energy features are calculated to capture energy transfer for a short period of time. Energy is the magnitude sum of the discrete fast Fourier transform components of a signal. This sum is divided by the window length for normalization. The energy is calculated by the following expression [4].

$$\text{Energy}(w) = \frac{\sum_{i=1}^{i=n} x_i^2}{|w|},$$ [Expression 4]

$Xi\frac{1}{-}$ is an FFT component in the sliding window.

(4) Correlation Vector: a vector for each correlation between axes forming a pair is expressed by the following expression [5].

$$\text{Cor}(t) = [r_{xy}(t), r_{yz}(t), r_{zx}(t)],$$ [Expression 5]

$$r_{xy}(t) = \frac{1}{N-1} \sum_{t=1}^{N} \frac{a_i(t) - a_i}{S_i} \frac{a_j(t) - a_j}{S_j},$$

(5) Power spectrum density (PSD) of a frequency band: the PSD is a frequency-domain plot of power per frequency-to-Hz. The PSD features indicate repetitive movement in the frequency domain. The PSD is divided into four sections, i.e. 0-1, 1-2, 2-4 and 4-8 Hz according to frequencies.

Figure 7:
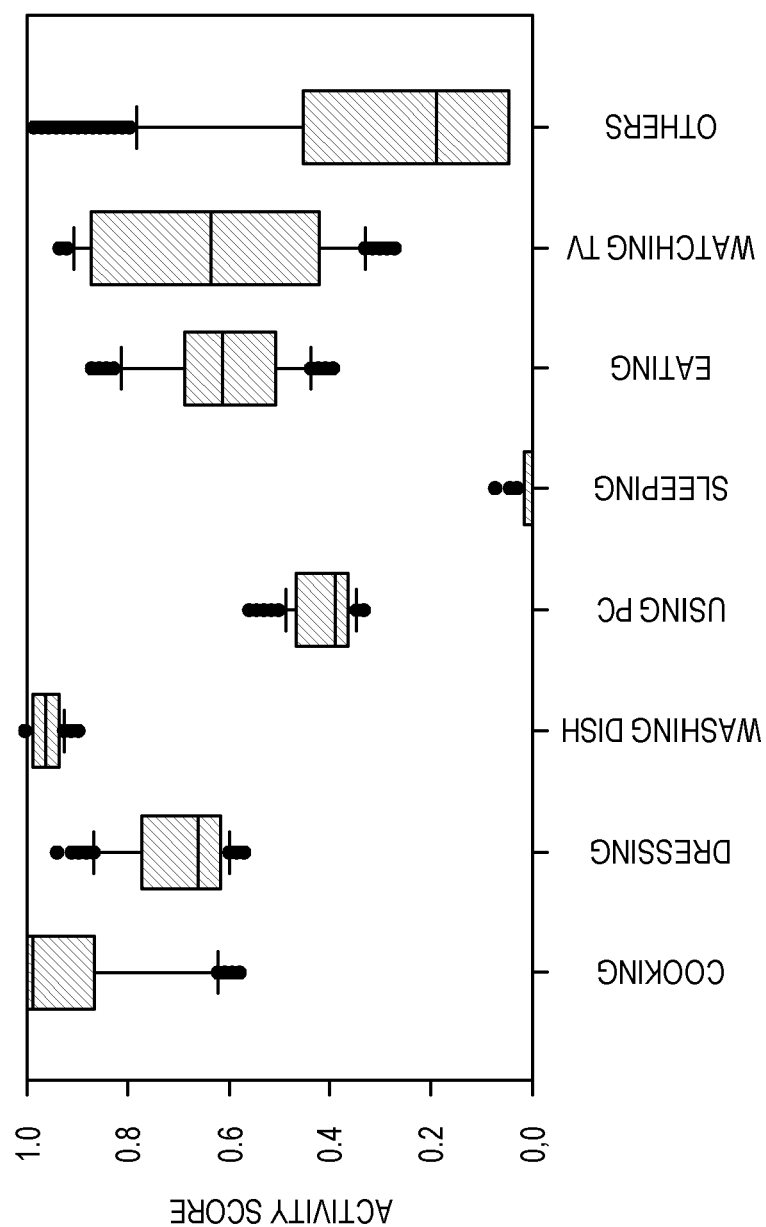
FIG. 7 is a view of showing activity scores corresponding to activities in a house.

(6) Activity score (AS): a user's activity level is calculated by monitoring how frequently an arm is used for a predetermined period of time (e.g. the past 10 minutes). The activity level indicates whether a user is in a stopped state of sitting in a chair or getting some sleep, or in a dynamic state involving complicated motions (e.g. cooking). The activity score is a key feature for distinguishing a sleeping activity from other activities as shown in FIG. 7. The activity score (AS) is calculated by the following expression [6].

$$\text{Activity score} = \frac{T_{active}}{T_{active} + T_{idle}}.$$ [Expression 6]

Sound recognition is performed using a built-in microphone of the smart watch 200. A sound of an activity or a unique surrounding sound in a space is used for inferring home activities. For example, from a water sound, it is possible to infer that someone is in a shower. When a user is in the stopped state, the microphone 220-2 of the smart watch 200 was used to record a sound for 3 seconds every 180 seconds. Next, a root mean square (RMS) and mel-frequency Cepstral coefficients (MFCCs) used in processing a usual conversation sound signal were extracted as sound features. "mel" refers to a standard unit for measurement based on a human's audible frequency. MFCC is based on linear cosine transform of a log-scale power spectrum on a mel-frequency filter bank. Here, a 25-mel filter bank was used, and the first 12 coefficients were calculated for sound features.

Figure 8:
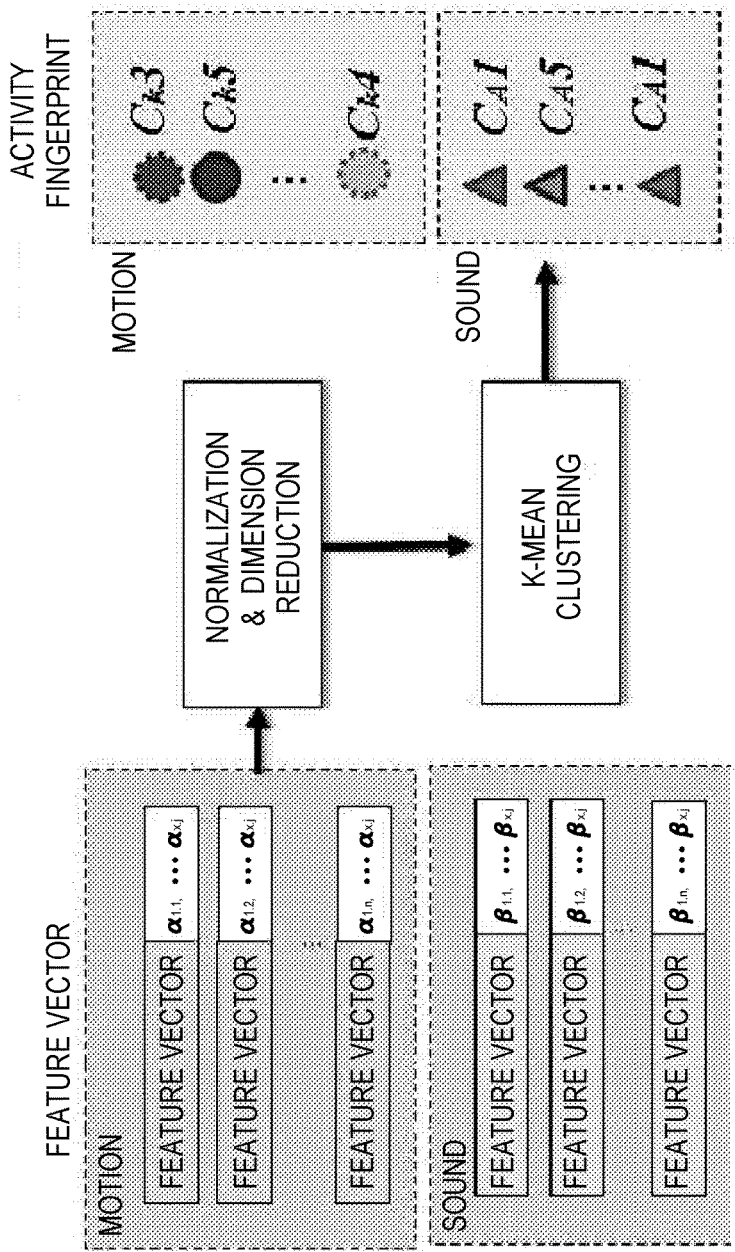
FIG. 8 is a schematic view of showing a process of generating activity fingerprints according to one embodiment of the present disclosure.

The cluster section 440 generates an activity fingerprint based on the extracted motion and sound features using a clustering algorithm Here, an annotation is automatically generated on learning data without a user's participation. Further, the extracted feature vectors are clustered to categorize sensed data according to human activities. First, the dimension of the vector is reduced using a linear discriminant analysis (LDA) dimension reducing method since the extracted features have high dimension vectors (e.g. a motion has a dimension of '37' and a sound has of '12'). As a clustering algorithm, a K-mean clustering algorithm categorizes the feature vectors based on similarity without manual labeling. In the K-mean clustering algorithm, the vectors are divided into k-exclusive groups, and k-seed vectors are initially selected from the features. As shown in FIG. 8, the clustering results of the feature vectors are defined as the activity fingerprint. The key point of the K-mean clustering algorithm is that its result is dependent on a K value known as "a priori". The K-value varied depending on home environments are determined empirically.

The position acquirer 500 includes a location fingerprint generator 510 using a Wi-Fi-based positioning system (WPS), and a range finder 520 for measuring a distance between the mobile phone 100 and the smart watch 200 using Bluetooth communication.

The Wi-Fi-based positioning system is widely used since it provides an accurate position (e.g. in a room level) of the mobile device without building an additional infrastructure. Although the Wi-Fi-based positioning system may be applied to the smart watch 200 and the like wearable devices, it is not suitable because a battery has to have a limited capacity and a small size. On assumption that each individual user personally carries the mobile phone 100, the WPS is used to obtain a user's location. When a user stays a certain space in a house, the mobile phone 100 measures RSS from neighborhood Wi-Fi routers. Next, when S(ft,fa)=ρ, a place of a and a time of t are determined. Herein, S(•) is the similarity function based on a Tanimoto coefficient, ft is an RSS vector measured by the mobile phone at the time of t, fa is a Wi-Fi fingerprint trained in the place of a, and p is a given threshold value.

Figure 9:
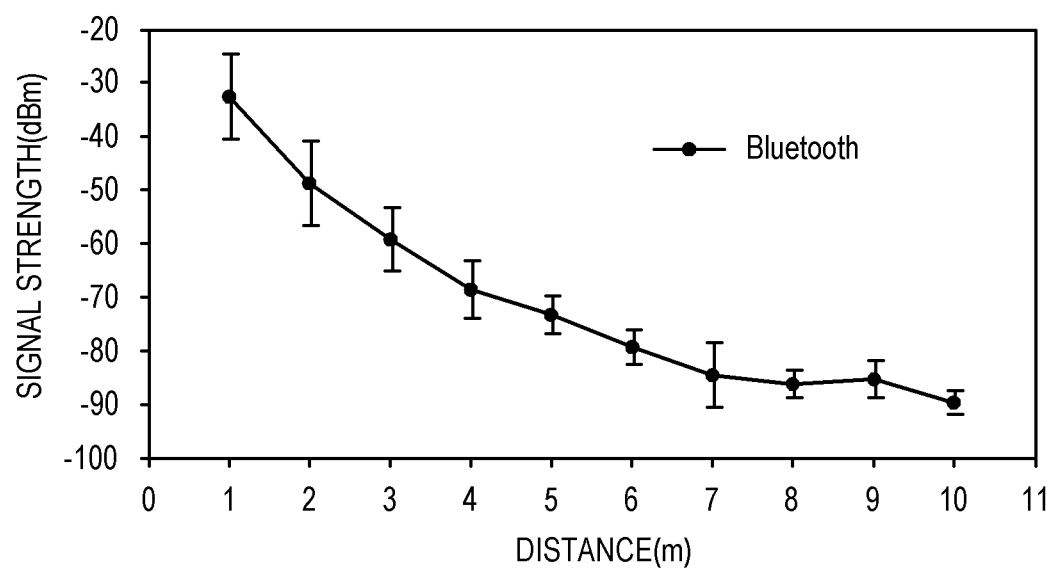
FIG. 9 is a graph of showing a relationship between signal strength and a distance in Bluetooth communication.

The mobile phone 100 collects RSS vectors periodically (e.g. every 5 minutes) to obtain room information. However, under home environments, it is not secured that the mobile phone 100 is always placed at the same location as a device owner. To filter out cases where a user is located in a different space from that of the mobile phone 100, the range finder 520 uses signal strength of Bluetooth communication between the mobile phone 100 and the smart watch 200. FIG. 9 shows the signal strength and distance of Bluetooth communication in spaces of the house. The Bluetooth signal has a transmission range of 10-20 m shorter than that of Wi-Fi. Therefore, a ratio of a Bluetooth signal to a distance is higher than that of the Wi-Fi the signal. When the distance between the mobile phone 100 and the smart watch 200 is shorter than or equal to 6 m, the signal strength is rapidly decreased by a distance difference of 1 m. When data exchange using Bluetooth at a distance closer than 4 m is achieved by −72 dBm, it is determined that the mobile phone 100 and the smart watch 200 are located in the same space.

The HMM-based position recognizer 600 includes two steps, i.e. a training stage and an evaluating stage. In the training stage, a relationship between the activities and the spaces in the house is made to perform training when a user is in the same location as the mobile phone 100. When a user is far away from the mobile phone 100 as the user is moving without carrying the mobile phone, the user's location is inferred by the evaluating stage using the activity fingerprints because the location is not directly determinable based on the WPS of the mobile phone 100.

According to one embodiment of the present disclosure, the training stage is needed for linking the spaces in the house and the activity fingerprints. In a conventional machine learning and recognizing system, types of activity they did are manually built. However, one embodiment of the present disclosure is focused on not the types of activity but user's location, and thus manual building is not needed during the training stage. When a user is located in the same location as the mobile phone 100, an evaluated location obtained from the WPS is used to generate a training sample of the inference model.

Figure 10:
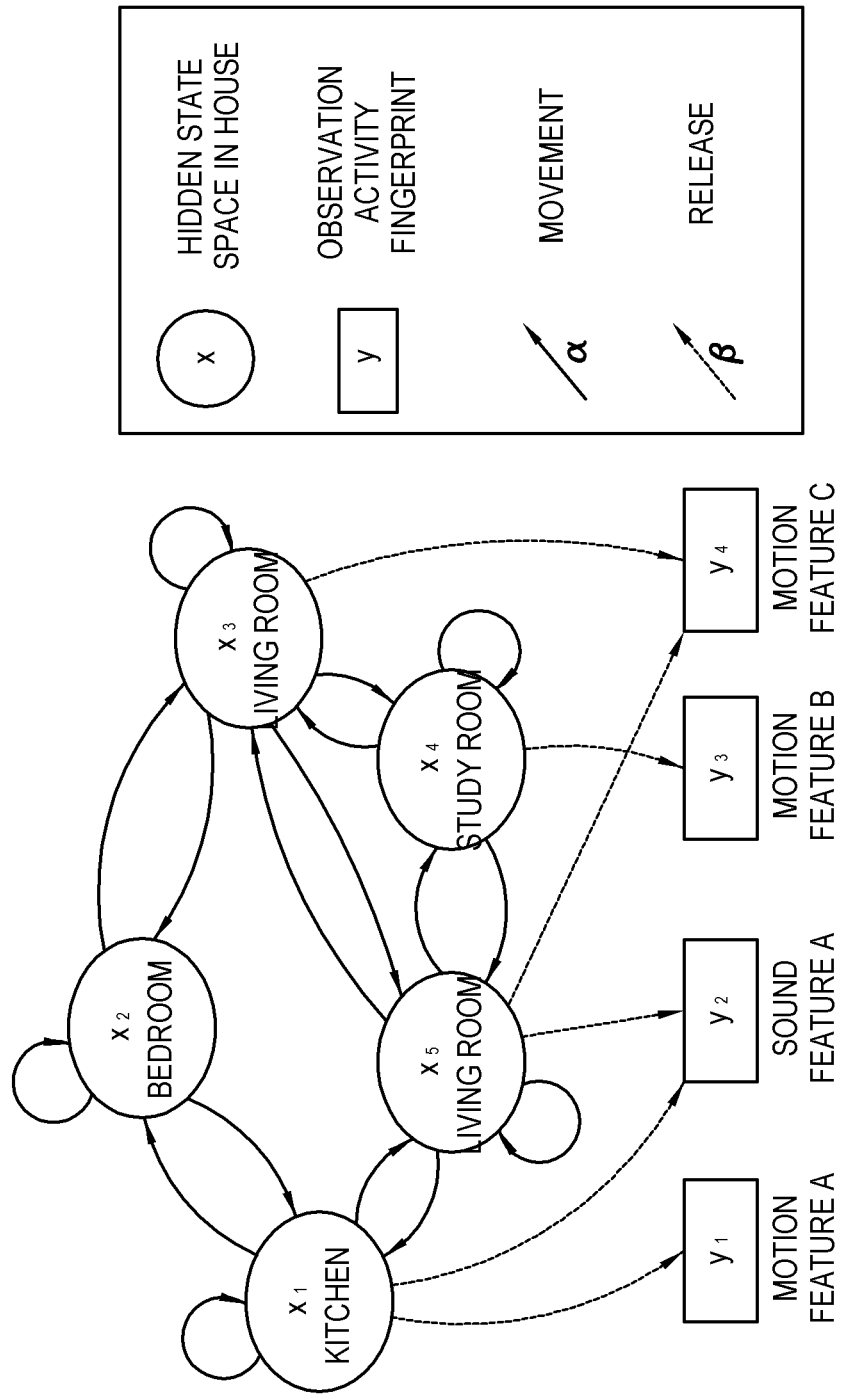
FIG. 10 is a schematic view of a hidden Markov model (HMM) for estimation of user location recognition.

The HMM-based position recognizer 600 employs the HMM to model user movements at home. The HMM is a generative probabilistic model having a hidden state x and an observation y. The state x releases observation having a conditional probability distribution known as an release probability a. Further, the movement between the hidden states is dominated by a probabilistic set called a movement probability β. FIG. 10 is a graphic expression of showing a location determining method based on an activity fingerprint. In the HMM, the state is hidden, and the observation is known, and therefore the major objective of the HMM is to determine a hidden state sequence (x1, x2, . . . , xt) corresponding to the observation sequence (y1, y2, . . . , yt). In this embodiment, a location set of rooms a user has previously visited is evaluated in a sequence of the observed activity fingerprints. To build the HMM, both the movement and release probability distribution are evaluated as the training samples.

The movement probability indicates a probability of moving from a state xi to a state xj, and is expressed by aij. To evaluate aij, a historically-observed movement is used through the foregoing WPS. A movement probability aij of a room location from ri to rj is calculated by the following expression [7].

$$\alpha_{ij} = p(x_i = r_j | x_{t-1} = r_i) = \frac{T(i, j)}{\sum_{k=1}^{N} T(i, k)}, \quad [\text{Expression 7}]$$

Herein, T(i,j) is a total number of movements from xi에서 xj in a training sample, and N is the number of rooms.

The release probability βij of the activity fingerprint afj corresponding to a given location ri is a probability of the activity fingerprint afj observed from a user who is in a room ri. The release probability βij is calculated by the following expression [8].

$$\beta_{ij} = p(y_t = af_j | x_t = r_i) = \frac{E(i, af_j)}{\sum_{k=1}^{M} E(i, af_k)}, \quad [\text{Expression 8}]$$

Herein, E(i, ak) is a total number for releasing afk in a state of xi, and M is a cluster number of feature vectors.

When a training set DB 620 is completely built by HMM training based on the release probability of an observing section 610 and the movement probability of a state section 620, and when it is sensed that a user is in the same location as the mobile phone 200, a user's location is obtained by a Viterbi decoding section 650 in the evaluating stage. The Viterbi decoding is used to evaluate the most probable hidden states in the HMM from the observed activity fingerprints. The Viterbi decoding is a dynamic programming-based algorithm for selecting the best state sequence of maximizing possibility of a state sequence from the given observed sequence. When the HMM model having a state space of X and an initial probability of p is given, the most possible state xk at a time t is calculated by a recurrence formula expressed with the following expression [9].

$$V_k(t) = \beta_{kt} \cdot \max(\alpha_{uk}(t) \cdot V_u(t-1)),$$

$$V_k(0) = \beta_{k0} \cdot \pi \quad [\text{Expression 9}]$$

Herein, auk is a movement probability from a state xu to a state xk, and βkt is a release probability aft of an activity fingerprint observed at a time t in a room location rk.

Figure 11:
FIG. 11 shows a layout example of electronic devices and spaces in a house.
Figure 12:
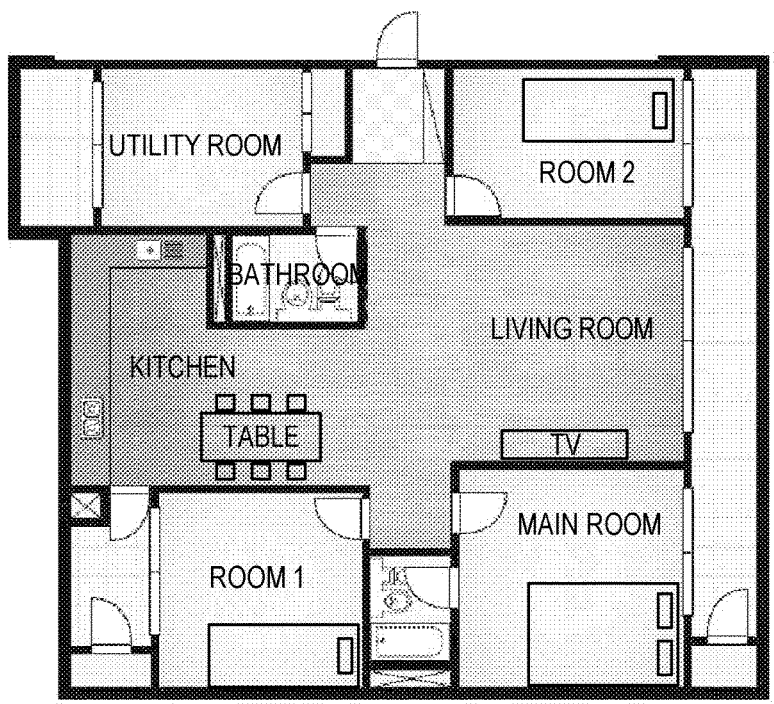
FIG. 12 shows another example of electronic devices and spaces in a house.

According to one embodiment of the present disclosure, an Android smart phone 100 and an S-company smart watch 200 were employed to perform experiments and collect data as follows. The smart watch 200 includes the triaxial acceleration sensor 220-1, the microphone 220-2, the gyroscope 220-3, the camera, the Bluetooth module 230, and the like various sensors. The smart phone 100 performs a Wi-Fi scan periodically (e.g. every 5 minutes) to infer a user's location using the Wi-Fi fingerprint technology, while the smart watch 200 continuously performs monitoring through its various sensors to collect the activity fingerprints. During the experiments, as shown in FIGS. 11 and 12, four users were monitored for 3~5 weeks in home environments (e.g. a home A and a home B). To collect a user's actually measured ground location for accurate evaluation, a request message was given to the users when the moving state is switched over to the stopped state or when a duty cycle (e.g. 15 minutes) times out, and thus their location and current activities were recorded on the smart watch.

Figure 13:
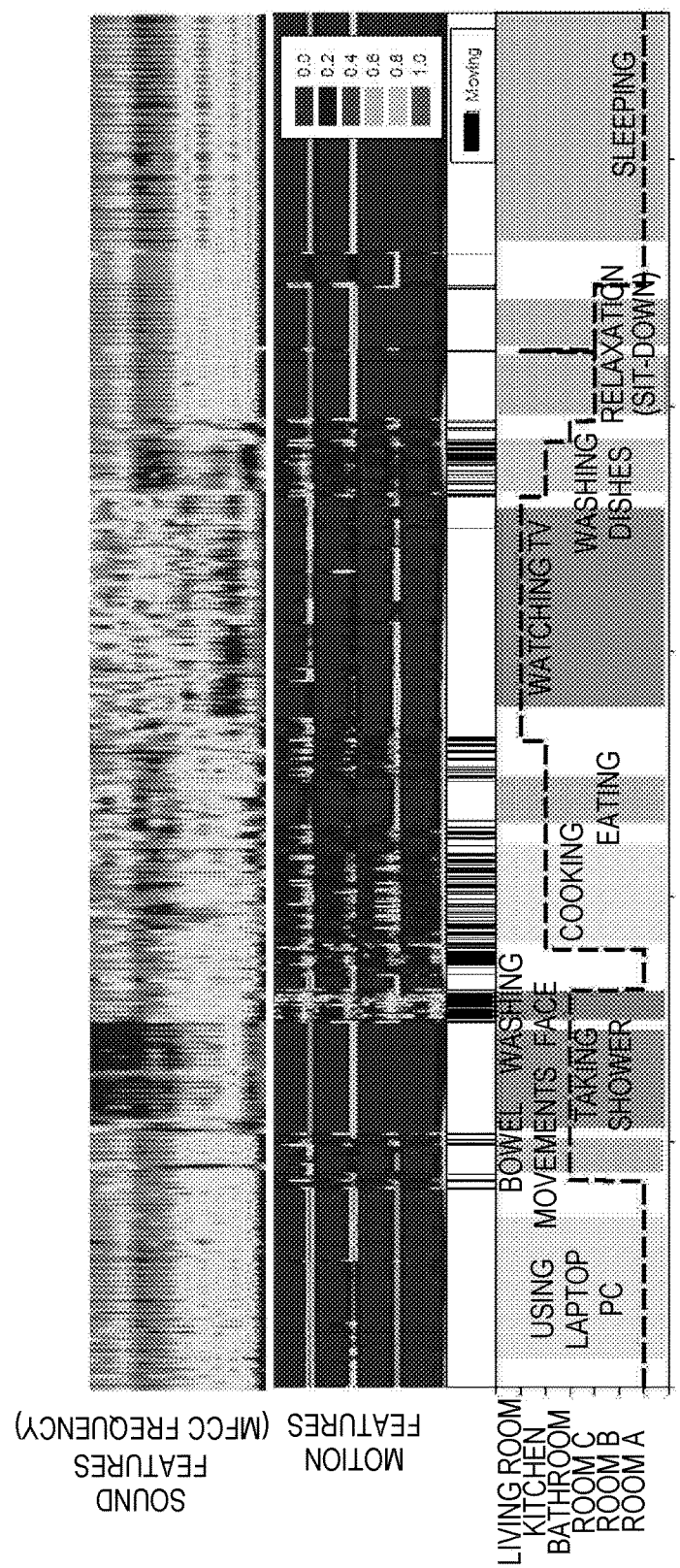
FIG. 13 shows traces of a daily activity in a house.
Figure 14:
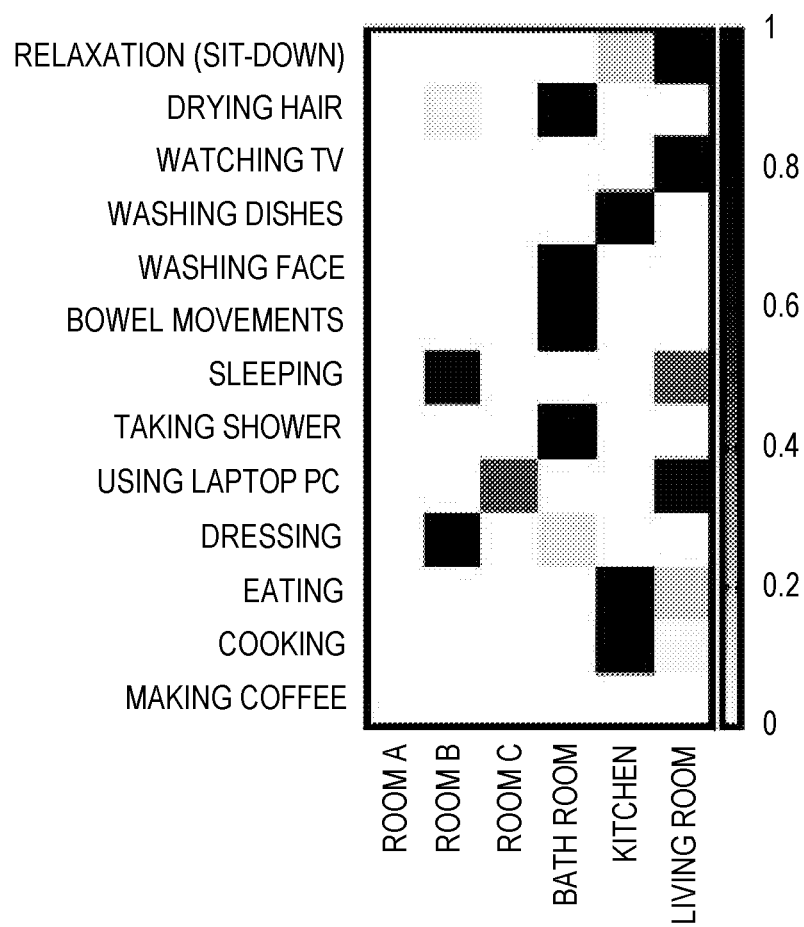
FIGS. 14 to 17 are views of showing relationships between activities and spaces according to users.

FIG. 13 shows traces of a user's actual activities and location, and motion and sound features in home. The motion and sound features were visually represented by normalizing their components in a range of 0~1. As shown in FIG. 13, a user did various activities while moving from a room to a room, and unique features of the activities were observed. Some activities such as using a laptop computer did not show clear difference from other activities in light of the sound features. In case of taking a shower, the motion features are invalid since the user does not wear the smart watch, but the sound features are valid since a sound of water is sensible. In result, using both the motion features and the sound features is more effective than using one of them.

To show a correlation between the activity and the space, a correlation coefficient between the activity and the location was calculated by the following expression [10].

$$C_{a_i, l_j} = \frac{\text{\# of labeled location is } f \text{ in fingerprints for activity } i}{\text{\# of genteraed fingerprrints for activity } i}.$$ [Expression 10]

FIGS. 14 to 17 show results of correlation coefficients of four users A, B, C, and D. High correlation coefficient indicates that the activity is always done in the corresponding location. The home activity is always associated with a certain space. However, the location corresponding to the activity of the user A or C is different from that of the user B or D even though they live together. Further, some activities are not clearly dependent on one location. For example, the user A occasionally uses the laptop computer in either of a room C or a living room, whereas the use of the PC/laptop computer by a user B is generally dependent on a room A. A housewife (e.g. users A and C) goes around almost all the rooms such as a kitchen, a living room, other private rooms, and the like sharing spaces in the house, whereas the other users B and C goes around only some rooms such as their own rooms, a living room, and a bathroom. In result, the evaluation of a user's location based on monitoring the activities has to be trained and experimented by a personal method.

To evaluate the efficiency of the activity fingerprint, a parameter (i.e. the input k of the clustering algorithm) of the user location recognition system 1 of the present disclosure is first selected, and then the HMM inference model built with information about the actually measured ground locations is used to evaluate the performance of the user location recognition system 1.

Figure 18:
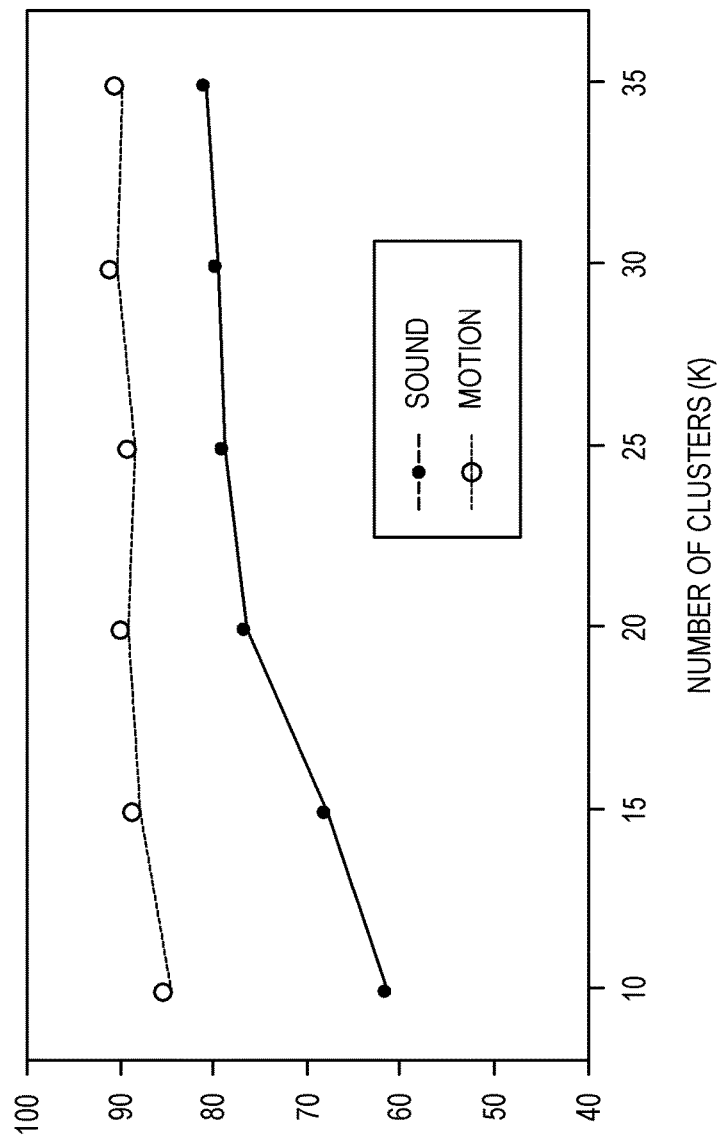
FIG. 18 is a graph of showing accuracy in estimation according to clusters k.

First, the performance of the proposed system trained with the actually measured ground location information is evaluated based on the manually built data. For the accurate evaluation, an actual location established by a user is compared with a location evaluated based on the activity fingerprint. FIG. 18 shows an effect caused by the number of clusters used in generating the activity fingerprint. In general, a larger number of clusters increases the accuracy of the location evaluation since activities of a human are represented better by subdivided activity fingerprints. However, when the number of clusters is higher than 20, there are no significant differences in accuracy. Therefore, a cluster value k is determined as 25 since 25 kinds of activity fingerprints are enough to represent human activities in home.

Figure 19:
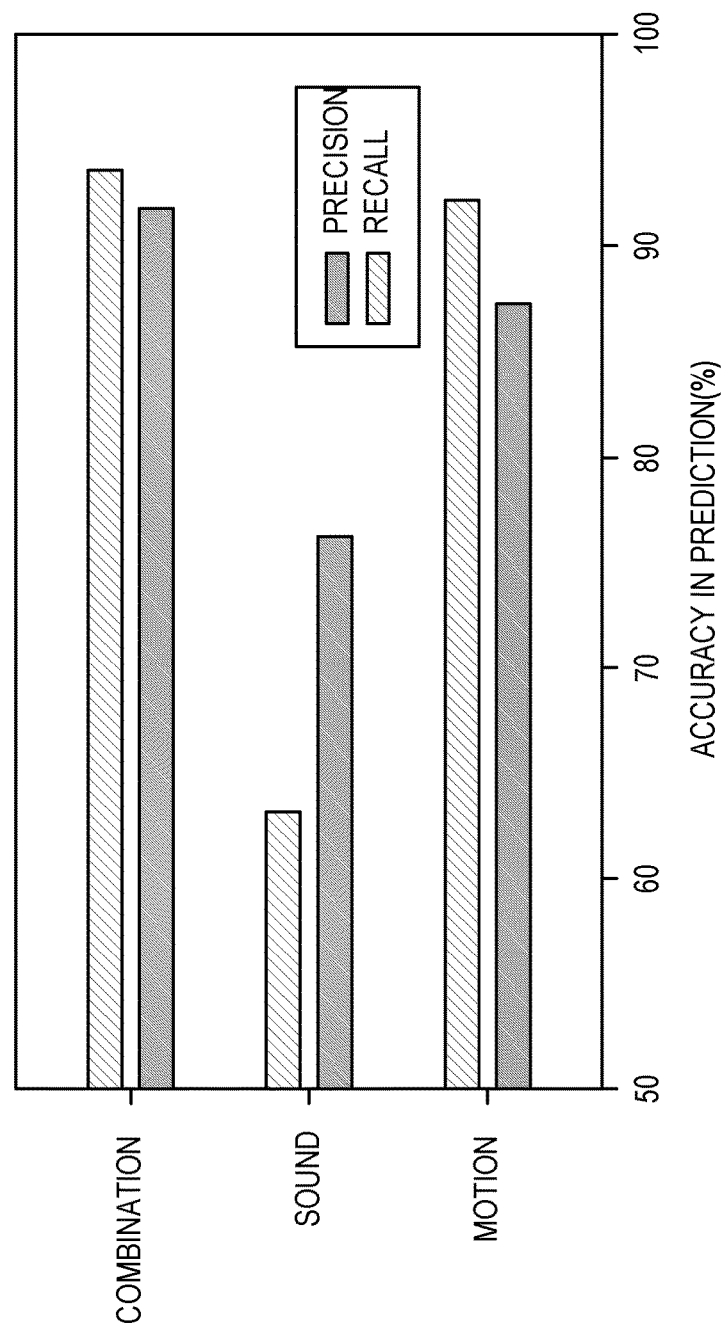
FIG. 19 is a graph of showing accuracy according to kinds of estimation features.

FIG. 19 shows estimation accuracy of precision and recall with regard to single or combination features of the motion features and the sound features, in which the precision in using the single feature is 87% for the motion features and 76% for the sound feature. However, the precision and recall in using both the motion and sound features are 90% or higher.

FIG. 20 shows accuracy of the system 1 of the present disclosure according to spaces in a house. As shown in FIG. 20, the precision and the recall were 90% or higher in all spaces except a bathroom and a kitchen, and the precisions about the bathroom and the kitchen were respectively 83.9% and 85.0%.

Figure 21:
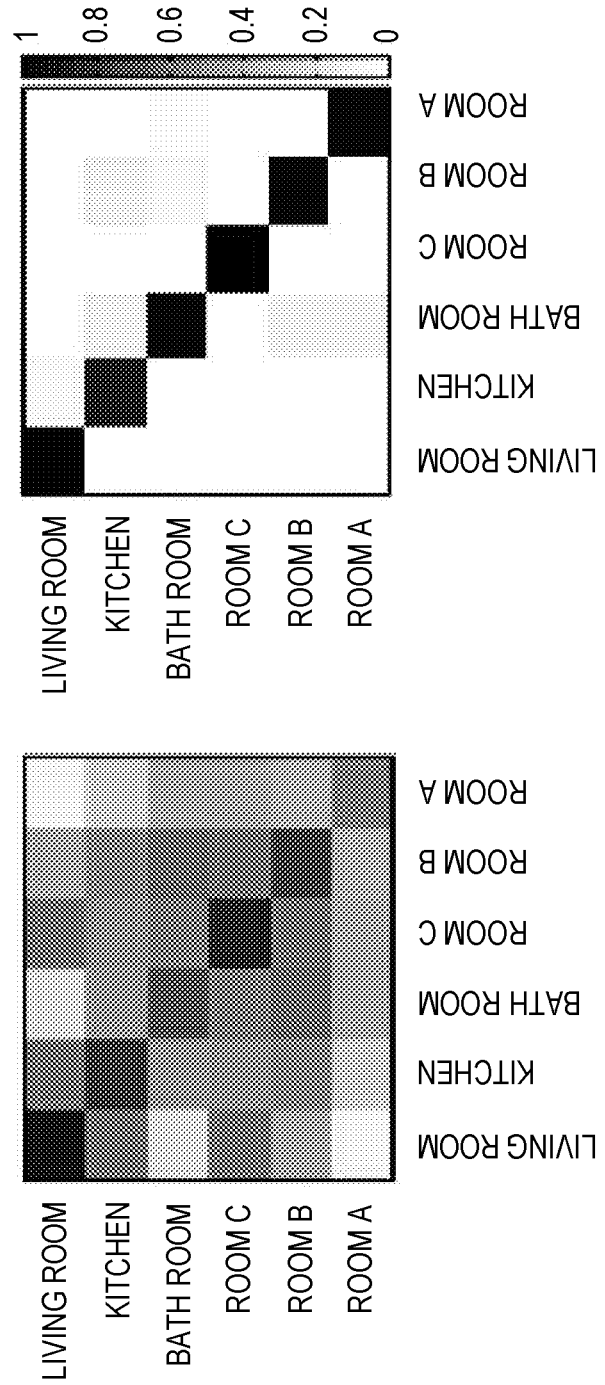
FIG. 21 is a view for explaining use location determination in a Wi-Fi positioning system.

The activity-based user location recognition system 1 of the present disclosure automatically labels the location of the activity fingerprint using the Wi-Fi fingerprint technology without manual building. A user collects three RSS measurement values from each room to build a wireless DB, and then evaluate a user's location and the RSS measurement value collected during the experiment. In FIG. 21, (a) shows similarity of normalized RSS vectors collected in home A. In most cases, a RSS measurement value in one room is different from that in another room. In FIG. 21, (b) shows accuracy of the Wi-Fi-based positioning system according to room locations. The Wi-Fi-based positioning system shows an accuracy of 91% in home A, and an accuracy of 88% in home B.

Figure 15:
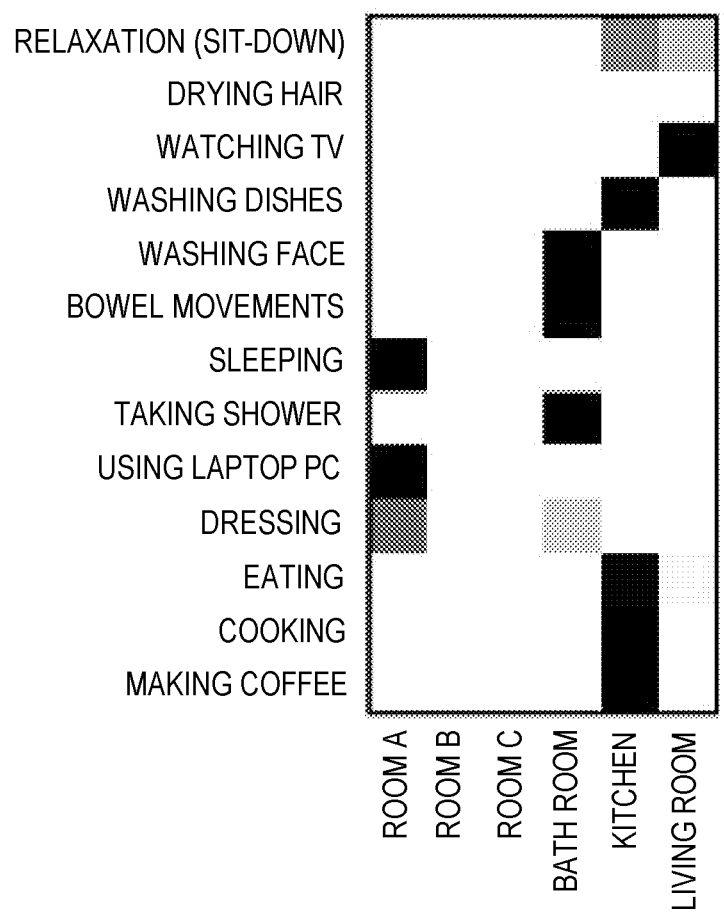
Figure 16:
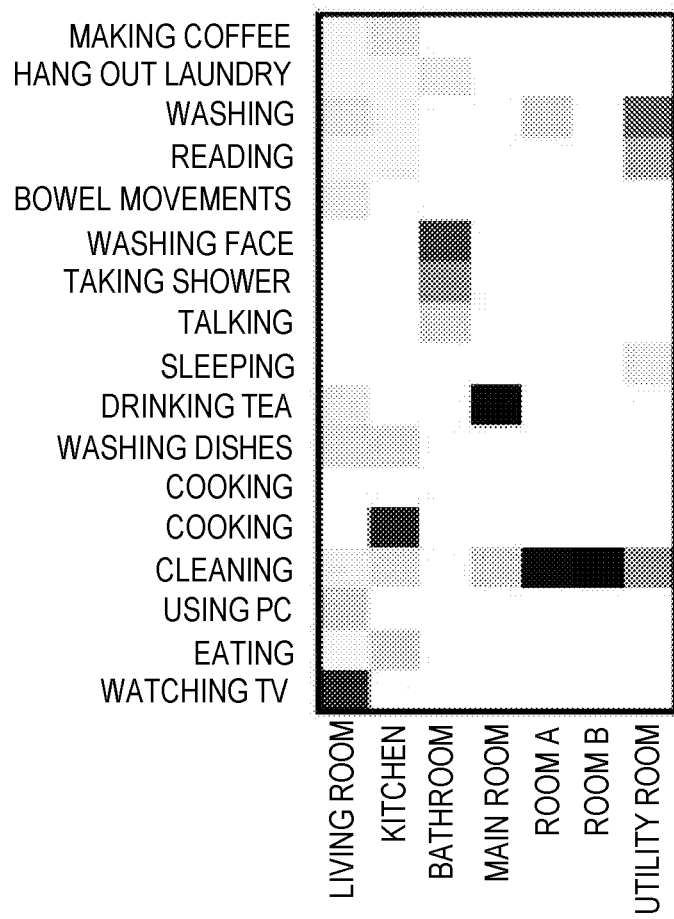
Figure 17:
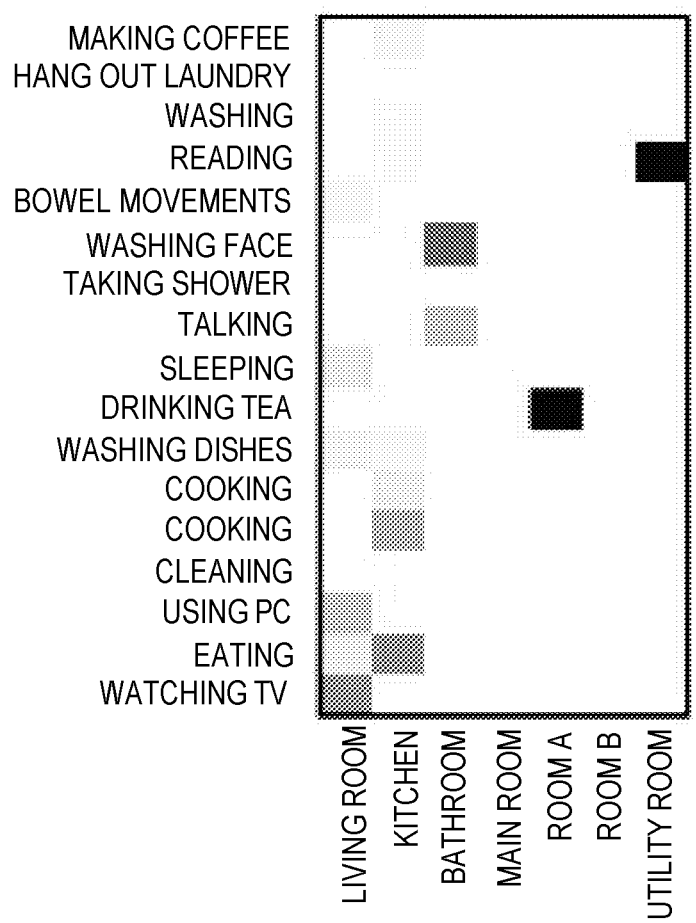
Figure 22:
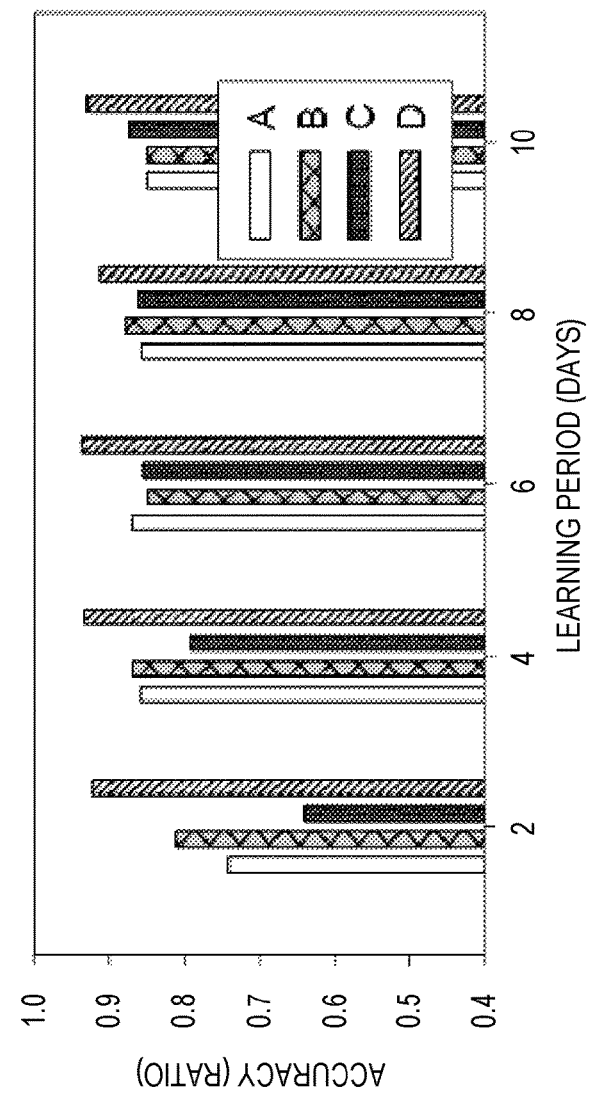
FIG. 22 is a graph of showing accuracy according to learning periods of time.

In addition, an effect on a training period about a predicted location was evaluated to analyze the amount and time of requiring training samples for accurately predicting the location. FIG. 22 is a graph of showing a relationship between a training period and prediction accuracy according to individuals. A user's location was accurately inferred from the training samples collected for 5 days. In particular, in case of the users B and D, their home activities and corresponding locations were sufficiently learned at an accuracy of 80% or higher with only the training samples collected just for 2 days. This result is because the user B and D are students who have very simple activities and moving patterns in their rooms as shown in FIGS. 15 and 17.

To evaluate the performance of the user location recognition system 1 of the present disclosure, in which training samples are automatically built using the WPS, it was compared with a well-known classification method. As a comparison model, a support vector machine (SVM), which has been widely used as a discriminant classifier for activity recognition and audio classification, was used. To use the SVM, a set of training samples (vi, r1), . . . , (vt, rt) was applied. vt is a feature vector extracted from the smart watch 200 at a time t, rt is a label of a room location at the time t. Since there are two kinds of feature vectors in the user location recognition system 1, two SVM-based classifiers were used for the motion features and the sound features. Each classifier independently classifies the feature vectors and the user locations. However, the feature vectors from a combination sensor are generated in different duty cycles because of a power consumption issue. The location evaluation with the maximum combination possibility of two classifiers is performed by the following expression [11].

$$L(t) \approx \arg_{r_i} \max p(L=r_i|C_k) \cdot p(L=r_i|a)$$ [Expression 11]

Herein, ri is a room location, and Ck and Ca are SVM classifiers for the motion feature and the sound feature, respectively.

Figure 23:
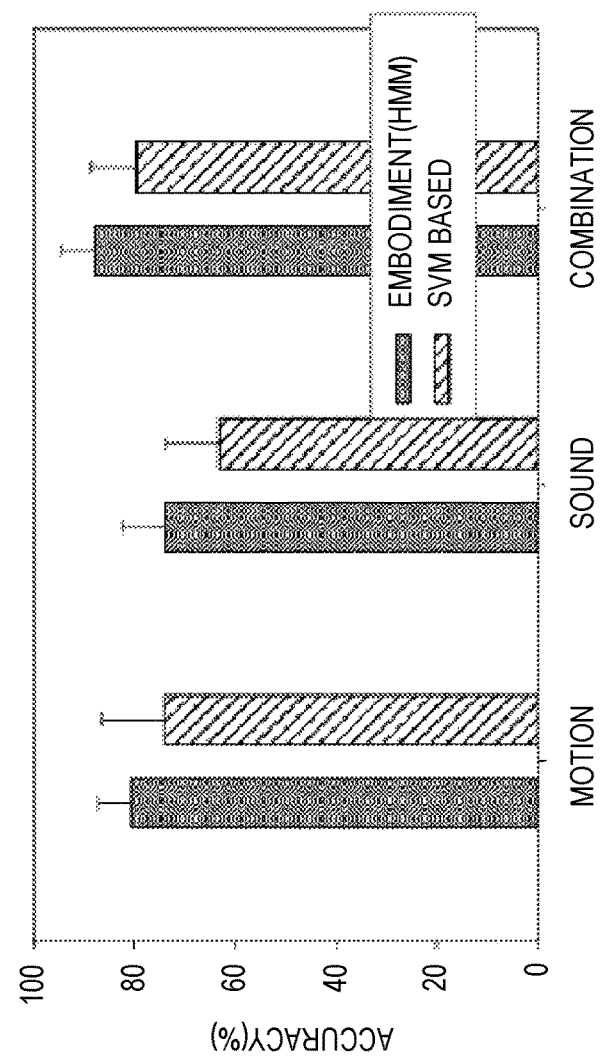
FIG. 23 is a graph of showing accuracy estimated corresponding to extraction features according to one embodiment of the present disclosure.

FIG. 23 is a graph of showing comparison in performance between the embodiment of the present disclosure and the SVM-based classification method. As shown in FIG. 23, whatever sensor the embodiment of the present disclosure selects, the embodiment of the present disclosure is superior to the SVM-based classification method. The SVM-based classification method employs the single motion features rather than the single sound features because the sound features are affected by other sounds or surrounding noise generated due to external environmental factors.

Figure 24:
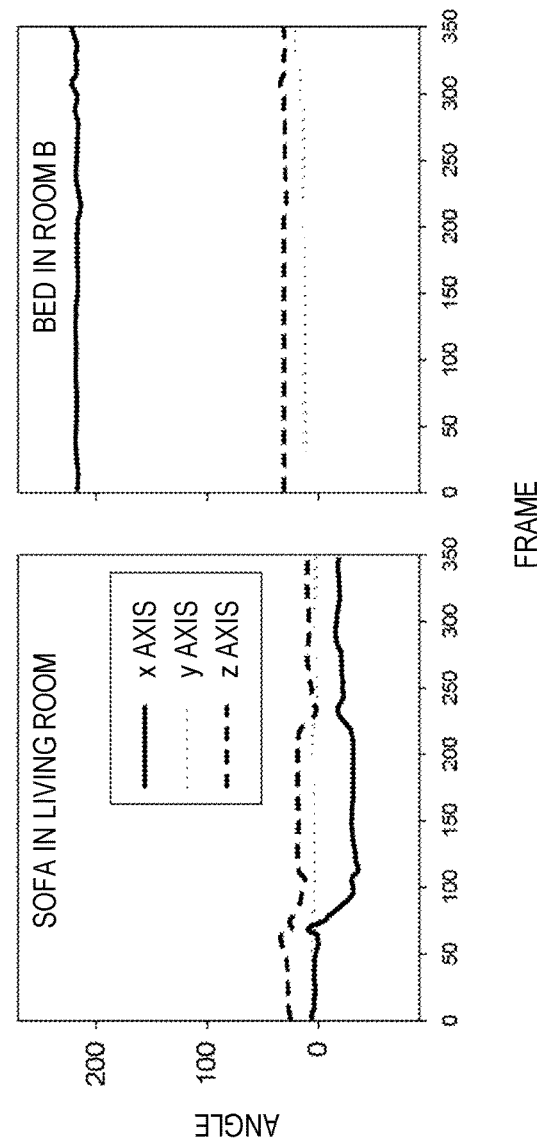
FIG. 24 is a graph of showing difference in the same line according to different spaces.

To distinguish similar activities, other sensors than the acceleration sensor and the microphone, e.g. a magnetic sensor for sensing orientation features may be used. FIG. 24 is a graph of showing the orientation features from the magnetic sensor for distinguishing the same activity in different spaces. As shown in FIG. 24, an activity of sitting in the bathroom, an activity of sitting in a kitchen chair, and an activity of sitting on a sofa in a living room are similar in the motion features for the acceleration sensor, and it is therefore difficult to distinguish them from each other. Further, some activities (e.g. sleeping of a user B and using a laptop computer) are made in many spaces. In this case, the similar activities in different locations are easily distinguished from one another by combining with the orientation features obtained by the magnetic sensor. According to the present disclosure, the heart-beat pulse sensor, the gyroscope, the gravity sensor, the optical sensor, the digital compass, the odor sensor, the proximity sensor, etc. may be used as well as the foregoing magnetic sensor, and unmentioned other kinds of sensor may be also used.

In the foregoing description according to one embodiment of the present disclosure, the wearable device, i.e. the smart watch 200 basically senses information about a user state and surrounding environments, and the mobile phone, i.e. the smart phone 100 obtains the location information using Wi-Fi and Bluetooth. In addition, when more sufficient battery capacity, size and data processing power are taken into account, the smart phone 100 may obtain a second activity fingerprint through sensors for sensing information about a user state and surrounding environments and thus improve accuracy in the HMM-based user location recognition.

The HMM-based user location recognition may be performed in the smart phone 100, or the smart phone 100 obtains just the location information and the activity feature information and transmits them to a server so that the server can perform the recognition.

Figure 25:
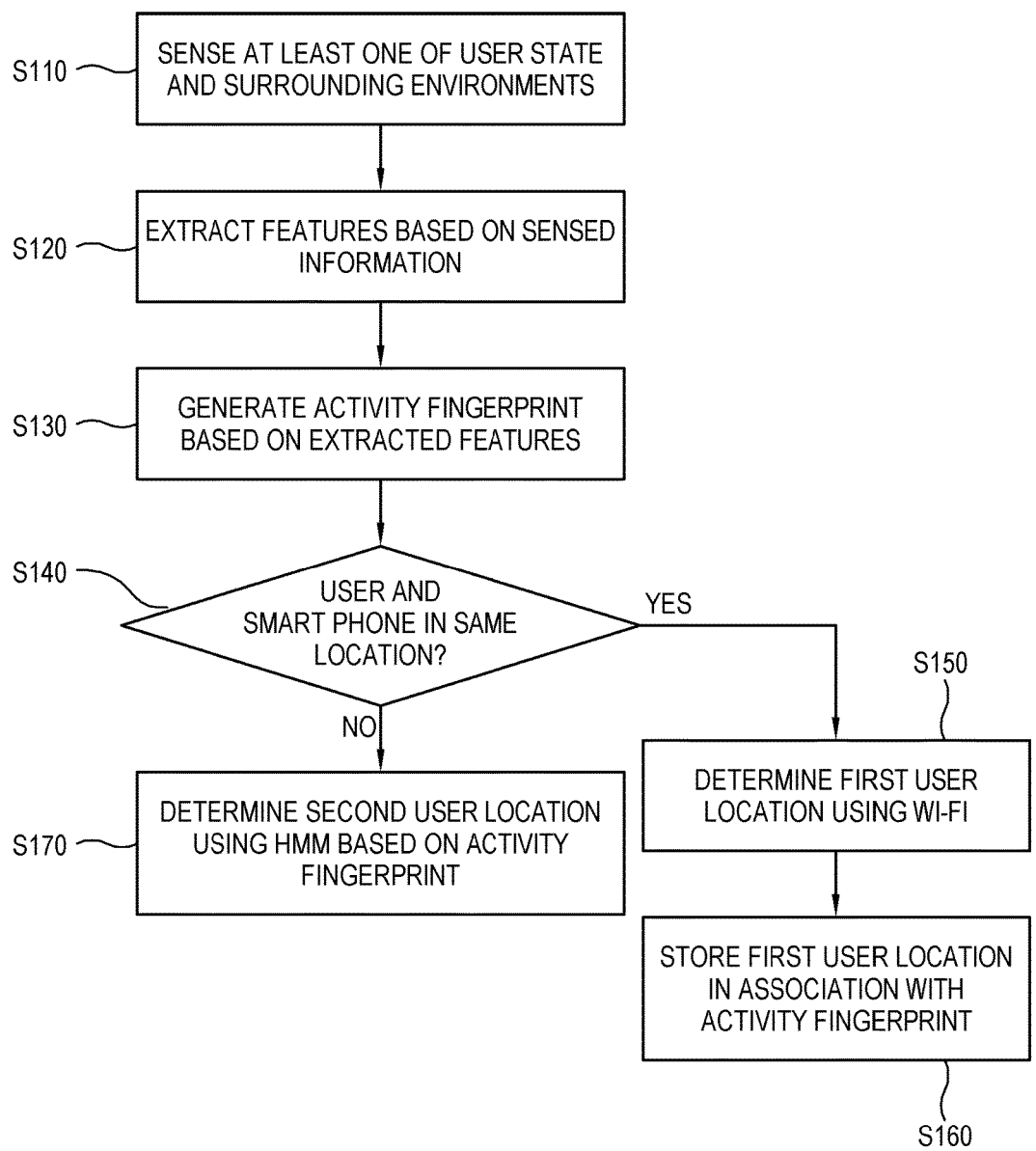
FIG. 25 is a flowchart of a user location recognition method according to one embodiment of the present disclosure.

Below, the user location recognition method using the sensor-based activity recognition according to one embodiment of the present disclosure will be described with reference to FIG. 25.

At operation S110, the sensor of the smart watch 200 is used to sense information about at least one of a user state and surrounding environments.

At operation S120, the activity features are extracted based on the sensed information.

At operation S130, the activity fingerprint is generated based on the extracted features.

At operation S140, the smart phone 100 uses the Wi-Fi communication to determine the location of the smart phone 100, and uses the Bluetooth communication to measure a distance between the smart watch 200 and the smart phone 100, thereby determining whether a user is in the same location as the smart phone 100.

At operation S150, when the user is in the same location as the smart phone 100, the location of the smart phone 100 based on the Wi-Fi communication is determined as the user's location At operation S160, a fingerprint, which corresponds to a feature of an activity done by the user in the user location determined at the operation S150, is stored in association with the user location. This associated data may be utilized as a training DB for location and activity fingerprints.

At operation 170, when the user is not in the same location as the smart phone 100, the user's location is recognized using the HMM based on the activity fingerprint received from the smart watch 200.

Figure 26:
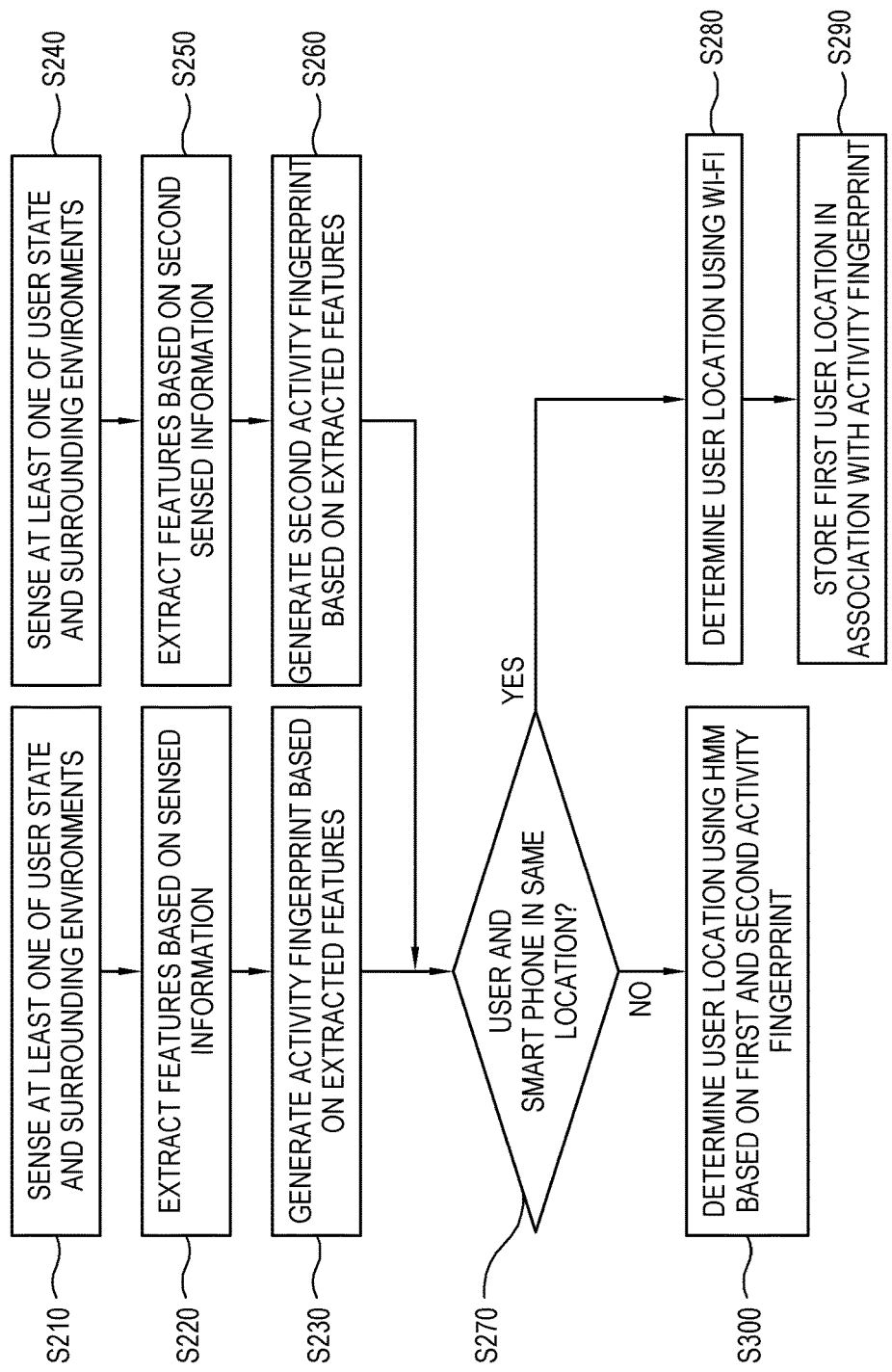
FIG. 26 is a flowchart of a user location recognition method according to another embodiment of the present disclosure.

FIG. 26 is a flowchart of the user location recognition method using the sensor-based activity recognition according to another embodiment of the present disclosure.

At operation S210, the sensor of the smart watch 200 is used to sense information about at least one of a user state and surrounding environments.

At operation S220, the activity features are extracted based on the sensed information.

At operation S230, the activity fingerprint is generated based on the extracted features.

At operation S240, the sensor of the smart phone 100 is used to sense second information including at least one of the user state information and the surrounding environment information.

At operation S250, second activity features are extracted based on the sensed second information.

At operation S260, second activity fingerprint is generated based on the extracted features.

At operation S270, the smart phone 100 uses the Wi-Fi communication to determine the location of the smart phone 100, and uses the Bluetooth communication to measure a distance between the smart watch 200 and the smart phone 100, thereby determining whether a user is in the same location as the smart phone 100.

At operation S280, when the user is in the same location as the smart phone 100, the location of the smart phone 100 based on the Wi-Fi communication is determined as the user's location At operation S290, a fingerprint, which corresponds to a feature of an activity done by the user in the user location determined at the operation S280, is stored in association with the user location. This associated data may be employed in recognizing the user's location based on the location and activity fingerprints, i.e. recognizing the user's location using the HMM based on the activity fingerprints.

At operation 300, when the user is not in the same location as the smart phone 100, the user's location is recognized using the HMM based on the first activity fingerprint received from the smart watch 200 and the second activity fingerprint of the smart phone 100.

Although a few exemplary embodiments and drawings have been shown and described, it will be appreciated by those skilled in the art that various modifications and changes may be made in these exemplary embodiments without departing from the principles and spirit of the disclosure.

The operations according to the foregoing exemplary embodiments may be performed by a single controller. In this case, a program command for performing the operations to be implemented by various computers may be recorded in a computer readable medium. The computer determinable medium may contain a program command, a data file, a data structure, etc. or combination thereof. The program command may be specially designed and made for the foregoing embodiments, or publicly known and available to those skilled in the art. As an example of the computer readable medium, there are a magnetic medium such as a hard disk drive, a floppy disk, a magnetic tape, etc. an optical medium such as a compact disc read only memory (CD-ROM), a digital versatile disc (DVD), a magnetic-optical medium such as a floptical disk, and a hardware device such as a read only memory (ROM), a random access memory (RAM), a flash memory, etc. specially configured to store and execute a program command. As an example of the program command, there is not only a machine code made by a compiler but also a high-level language code to be executable by a computer through an interpreter or the like. If a base station or relay described in this exemplary embodiment is fully or partially achieved by a computer program, the computer readable medium storing the computer program also belong to the present disclosure.

Therefore, the foregoing has to be considered as illustrative only. The scope of the disclosure is defined in the appended claims and their equivalents. Accordingly, all suitable modification and equivalents may fall within the scope of the disclosure.

INDUSTRIAL APPLICABILITY

A user terminal of the present disclosure is applied to a smart watch or a smart phone and senses a user's location in a user space, thereby controlling things.

The invention claimed is:

1. A user terminal device for recognizing a user location using sensor-based activity recognition, the user terminal device comprising:
   a communication interface circuitry (CIC) configured to receive activity information from a mobile device that senses information about at least one of a user state and surrounding environments, and extracts the activity information based on the sensed information, and configured to perform Bluetooth communication and Wi-Fi communication; and
   a processor configured to:
      identify a user location in a user space corresponding to a user activity based on the received activity information,
      measure a distance between the mobile device and the user terminal device based on signal strength of the Bluetooth communication with the mobile device, and
      based on a user and the user terminal device being identified to be in the same location when the measured distance is within a predetermined range, identifying a user terminal location obtained by a Wi-Fi-based positioning system (WPS) as a user location.

2. The user terminal device according to claim 1, wherein the mobile device comprises at least one first sensor comprising at least one of an acceleration sensor, a microphone, a heart-beat pulse sensor, a gyroscope, a geomagnetic sensor, a gravity sensor, an optical sensor, a digital compass, an odor sensor, or a proximity sensor.

3. The user terminal device according to claim 2, wherein the user terminal device comprises at least one second sensor comprising at least one of an acceleration sensor, a microphone, a gyroscope, a geomagnetic sensor, a gravity sensor, an optical sensor, a digital compass, an odor sensor, or a proximity sensor.

4. The user terminal device according to claim 3, wherein the mobile device extracts first activity information based on first sensed information sensed by the first sensor, and the processor extracts second activity information based on second sensed information sensed by the second sensor, and identifies a user location based on the first activity information and the second activity information.

5. The user terminal device according to claim 2, wherein the activity information comprises an activity fingerprint generated based on raw sense data obtained from the first sensor.

6. The user terminal device according to claim 5, wherein the activity fingerprint is generated by a clustering algorithm based on features extracted from the raw sense data.

7. The user terminal device according to claim 5, wherein the processor identifies a user location using a statistics Markov model based on the activity fingerprint.

8. The user terminal device according to claim 7, further comprising a storage configured to store user activity history data in which user activity corresponding to the activity information is associated with activity time.

9. The user terminal device according to claim 1, wherein the processor further comprises a storage configured to store an activity fingerprint corresponding to the user location as a learning model in association with the user location.

10. A system for recognizing a user location using sensor-based activity recognition, the system comprising:
    a mobile device which comprises at least one sensor configured to sense information about at least one of a user state and surrounding environments, a first processor configured to extract activity information based on the sensed information, and a first communication interface circuitry (CIC) configured to transmit the extracted activity information and to perform Bluetooth communication; and
    a user terminal device which comprises a second CIC configured to receive the activity information from the first CIC, and to perform the Bluetooth communication and Wi-Fi communication, and a second processor configured to:
       identify a user location in a user space corresponding to a user activity based on the received activity information,
       measure a distance between the mobile device and the user terminal device based on signal strength of the Bluetooth communication with the mobile device, and
       based on a user and the user terminal device being identified to be in the same location when the measured distance is within a predetermined range, identifying a user terminal location obtained by a Wi-Fi-based positioning system (WPS) as a user location.

11. A system for recognizing a user location using sensor-based activity recognition, the system comprising:
    a first mobile device which comprises at least one sensor configured to sense information about at least one of a user state and surrounding environments, a first processor configured to extract activity information based on the sensed information, and a first communication interface circuitry (CIC) configured to transmit the extracted activity information and to perform Bluetooth communication;
    a second mobile device which comprises a second CIC configured to perform Wi-Fi communication and Bluetooth communication, and a second processor configured to obtain its own location information through the Wi-Fi communication and obtain distance information from the first mobile device through the Bluetooth communication; and a user terminal device which comprises a third CIC configured to receive the activity information from the first CIC and the location information and the distance information from the second CIC, and a third processor configured to:
  identify the location information as a user location when the first mobile device and the second mobile device are within a predetermined distance based on the distance information,
  identify a user location in a user space corresponding to a user activity based on the received activity information when the first mobile device and the second mobile device are beyond a predetermined distance,
  measure a distance between the first mobile device and the user terminal device based on signal strength of the Bluetooth communication with the first mobile device, and
  based on a user and the user terminal device being identified to be in the same location when the measured distance is within a predetermined range, identifying a user terminal location obtained by a Wi-Fi-based positioning system (WPS) as a user location,
wherein the user terminal device is the same device as the second mobile device or a device different from the second mobile device.

12. A method of recognizing a user location using sensor-based activity recognition, the method comprising:
  by a mobile device, sensing information about at least one of a user state and surrounding environments
  extracting activity information based on the sensed information;
  transmitting the activity information to a user terminal device; and
  identifying a user location in a user space corresponding to the activity information based on the received activity information,
  wherein the identifying comprises:
    measuring a distance between the mobile device and the user terminal device based on signal strength of Bluetooth communication with the mobile device, and
    based on a user and the user terminal device being identified to be in the same location when the measured distance is within a predetermined range, identifying a user terminal location obtained by a Wi-Fi-based positioning system (WPS) as a user location.

13. A non-transitory recording medium for recording a program of identifying the user location in the user space corresponding to the user activity based on the activity information according to claim 12.

* * * * *